(12) United States Patent
Huang et al.

(10) Patent No.: US 11,570,553 B2
(45) Date of Patent: Jan. 31, 2023

(54) METHOD AND APPARATUS FOR SOUND ENHANCEMENT

(71) Applicant: Jiangsu aidiSciTech Reseach Institute Co., Ltd., Nanjing (CN)

(72) Inventors: Norden Eh Huang, Nanjing (CN); Jia-Rong Yeh, Taoyuan (CN)

(73) Assignee: Jiangsu aidiSciTech Reseach Institute Co., Ltd., Nanjing (CN)

( * ) Notice: Subject to any disclaimer, the term of this patent is extended or adjusted under 35 U.S.C. 154(b) by 0 days.

(21) Appl. No.: 16/764,057

(22) PCT Filed: Apr. 23, 2020

(86) PCT No.: PCT/CN2020/086485
§ 371 (c)(1),
(2) Date: Dec. 18, 2020

(87) PCT Pub. No.: WO2021/114545
PCT Pub. Date: Jun. 17, 2021

(65) Prior Publication Data
US 2021/0250704 A1    Aug. 12, 2021

(30) Foreign Application Priority Data

Dec. 11, 2019 (CN) .......................... 201911265653.1

(51) Int. Cl.
*H04R 25/00* (2006.01)
*H04M 3/42* (2006.01)

(52) U.S. Cl.
CPC ......... *H04R 25/356* (2013.01); *H04R 25/353* (2013.01); *H04R 25/505* (2013.01); *H04M 3/42391* (2013.01); *H04R 2225/43* (2013.01)

(58) Field of Classification Search
CPC ......... H04R 25/00; H04R 25/48; H04R 25/50
See application file for complete search history.

(56) References Cited

U.S. PATENT DOCUMENTS

| | | | |
|---|---|---|---|
| 4,410,764 A | 10/1983 | Werth et al. | |
| 5,983,162 A | 11/1999 | Huang | |

(Continued)

FOREIGN PATENT DOCUMENTS

| | | |
|---|---|---|
| CN | 102222507 A | 10/2011 |
| CN | 103778920 A | 5/2014 |

(Continued)

OTHER PUBLICATIONS

U.S. Appl. No. 16/764,057, filed May 14, 2020, Jiangsu aidiSciTech Research Institu.

(Continued)

*Primary Examiner* — Suhan Ni
(74) *Attorney, Agent, or Firm* — Tomanageip

(57) ABSTRACT

A method and apparatus for sound enhancement are provided in this invention. The method comprises: obtaining sound signals and converting the sound signals into digital signals; decomposing the digital signals to obtain a plurality of IMFs or pseudo-IMFs; selectively amplifying the amplitudes of the IMFs and pseudo-IMFs; reconstituting the selectively amplified IMFs or pseudo-IMFs to obtain reconstituted signals and converting the reconstituted signals into analog signals. The present invention is based on the Hilbert-Huang transform. Through the present invention, the (Continued)

sound can be selectively amplified, and only the high-frequency consonants in the sound are amplified without vowel, which effectively improves the clarity of the enhanced sound. The present invention overcomes the problems in the current sound enhancement method which makes the sound louder without increasing the clarity.

15 Claims, 20 Drawing Sheets

(56) References Cited

U.S. PATENT DOCUMENTS

| | | | |
|---|---|---|---|
| 6,240,192 B1* | 5/2001 | Brennan | H04R 25/505 |
| | | | 381/314 |
| 6,311,130 B1 | 10/2001 | Huang | |
| 6,381,559 B1 | 4/2002 | Huang | |
| 6,738,734 B1 | 5/2004 | Huang | |
| 6,862,558 B2 | 3/2005 | Huang | |
| 6,901,353 B1 | 5/2005 | Huang | |
| 7,941,298 B2 | 5/2011 | Huang et al. | |
| 9,818,416 B1* | 11/2017 | Kamen | G10L 19/02 |
| 2014/0177853 A1 | 6/2014 | Toyama | |
| 2016/0113539 A1* | 4/2016 | Sinharay | A61B 5/7203 |
| | | | 600/544 |
| 2018/0116597 A1* | 5/2018 | Yu | A61B 5/0064 |
| 2020/0187809 A1* | 6/2020 | Larsen | A61B 5/291 |

FOREIGN PATENT DOCUMENTS

| | | |
|---|---|---|
| CN | 104244155 A | 12/2014 |
| CN | 104299620 A | 1/2015 |
| CN | 105095559 A | 11/2015 |
| CN | 107547983 A | 1/2018 |
| CN | 109785854 A | 5/2019 |
| CN | 110426569 A | 11/2019 |
| WO | WO2018217676 A1 | 11/2018 |
| WO | WO2018217677 A1 | 11/2018 |
| WO | WO2019118307 A1 | 6/2019 |

OTHER PUBLICATIONS

Zhuo-Fu Liu, Zhen-Peng Liao and En-Fang Sang, Speech enhancement based on Hilbert-Huang transform, International Conference on Machine Learning & Cybernetics Nov. 7, 2005.
The newly developed Hilbert-Huang transform (HHT) is introduced briefly in this paper. The HHT method is specially developed for analyzing nonlinear and non-stationary data.

* cited by examiner

METHOD AND APPARATUS FOR SOUND ENHANCEMENT

TECHNICAL FIELD

The present invention relates to the technical field of sound enhancement, and particularly to method and apparatus for sound enhancement.

BACKGROUND OF THE INVENTION

1. Hearing Mechanism

An acoustic signal is perceived as sound when the pressure wave associated with the acoustic signal propagates through the external auditory canal and impinges on the tympanic membrane. This vibration is amplified around 22 times through the ossicle mechanism (including the Malleus, Incus and Stapes), reaching the oval window at the base of the cochlea. The vibration of the membrane at the oval window then generates a pressure wave in the vestibule, which will deform the soft Basilar membrane together with the organ of Corti and the stereocilia (or the hair cells), and will touch the tectorial membrane that bend the hair cells. More importantly, this wave in the Basilar membrane will have a maximum amplitude commeasured with the characteristic frequency generated by this vibration. The bending of the hair cells at the crests will trigger the neurons to emit electric impulses that will travel through the thalamocortical system and reach the Primary Auditory Cortex (PAC) for processing to produce the perceived sounds. This electric signal would determine the frequency of the acoustic signal, which could be measured noninvasively by Functional Magnetic Resonance Imaging (FMRI) and Electroencephalogram (EEG) as Auditory Brainstem Response (ABR). Thus, it is clear that the critical mechanism for sound perception is the movement of the organ of Corti and the associated hair cells. This motion is determined by hydrodynamics principle of the scala media and the Basilar membrane in the cochlea.

2. Hearing Loss

Hearing loss can result from problems in any part of this long chain of events described above. If blockage occurs in the outer auditory canal to prevent sound from reaching the cochlea, we have a case of conductive hearing loss. If there is any dysfunction in the inner ear, such as degeneration of the hair cells, it will prevent the generation and transmission of neural impulses and prevent them from reaching the PAC, then we have a case of sensorineural hearing loss. Of course, hearing loss may also be caused by a combination of the above causes. The causes of hearing impairment could be ageing (presbycusis), excessive exposure to noise (noise-induced hearing loss, NIHL), heredity (congenital hearing loss), deafness caused by toxins from medications, and many others. Whatever the cause, hearing aids are usually helpful except for central deafness.

Among all the causes of hearing loss, the most common one is the loss of hearing sensitivity to certain frequency bands, which can be detected by an audiogram in a hearing test. For presbycusis cases, hearing sensitivity in high-frequency bands is lost; while for NIHL cases, hearing sensitivity is lost in some notched bands. The main symptoms of the resulting hearing loss are the difficulty in understanding sounds, especially from women and children with higher frequency fundamentals, and the difficulty in understanding sounds with background noises, which is also known as the cocktail party problem. Even with hearing aids, the complaint is usually that the sounds become loud but lose clarity. It is seen from the foregoing, a feasible approach to remedy hearing loss is to amplify sound in a specific weakened frequency band. This is precisely the principle of selective amplification of current hearing aids on the market. Unfortunately, such hearing aids do not perform well in the hearing aid, for even after correction with such hearing aids, the same complaint persists: the sounds become loud but not clear. Statistics show that, currently of the 25% of hearing-impaired people who have access to hearing aids, 60% would not use them consistently even if they are equipped with hearing aids.

3. Defects in Current Hearing Aid Designs

The root of the defects in current hearing aid designs is that the understanding of sound perception is built upon a crucial mis-conception. Ever since Helmholtz made the famous statement: "All sounds, no matter how complex, can be mathematically broken down into sine waves", sounds have been expressed in Fourier frequencies. But in the human auditory perception, this does not work, for there are anomalies such as missing fundamental phenomenon and a tone generated by sine wave-modulated white noise. "Missing fundamental phenomenon" means that the fundamentals of a compound sound can be clearly heard, but the fundamentals are not shown in the Fourier spectrum. To remedy these shortcomings, 'pitch' was introduced, which claims that sound perception is based on 'periodicity', depending on the envelope resulted from modulation, not on frequency. For lack of an adequate rigorous method to determine the modulation patterns, pitch is defined only subjectively. Yet, the audiogram, on which hearing loss is measured, and hearing aid is prescribed and fitted, is still based on the Fourier based frequency of pure sinusoidal sound. Consequently, the current Fourier based hearing aid is to amplify the presumed weakened high frequency bands, which are mostly harmonics that have relatively very little to do with the sound one perceived. Based on the missing fundamental phenomenon, amplification of the harmonics is tantamount to amplify the fundamentals. Hearing-impaired patients have no problem hearing the fundamentals; they have problems with the high frequency sound mostly from un-voiced consonants. Amplification of the harmonics, and therefore of the fundamentals, would make the sound louder. Yet, the inability to hear the consonants would result in loss of clarity. Clearly, we have a problem in the current hearing aid approach.

The confusion is deeply rooted in our misconception of the audible sound theory. Fourier analysis is based on linear and stationary assumptions, but sounds in speech and music are neither linear nor stationary. Due to nonstationarity, the only parts of the sound that Fourier analysis could be applied to are the vowels and some voiced consonants, the sounds pertaining to the vibration of the vocal cords, which open slower than close, and produce nonlinear waves with asymmetric and distorted profiles. In Fourier analysis, those sounds are rich in harmonics, whenever vocal cords are involved in producing the sounds. Amplification of harmonics is equivalent to amplification of the fundamentals, the latter ones are of lower frequencies, which are not the problems of hearing loss.

Hearing loss indeed is resulted from the loss of sensitivity to high-frequency sounds mostly generated by consonants. Consonants define clarity and carry the meanings of sounds. But consonants are transient; they are not amenable to Fourier analysis and are usually ignored in the Fourier analysis. As a result, amplification of the higher frequencies of the vowels in Fourier analysis is equivalent to amplification of the harmonics, which thus produces louder fundamentals as indicated by the famous missing fundamental phenomenon. The consonants are left out. The result is exactly the louder sound but still lacking clarity. Indeed, clarity is diminished due to inadequate representation of the TFS (Temporal Fine Structure, also known as Consonants) pertaining to the consonants.

Importantly, the nonlinear and nonstationary acoustic signals should not be analyzed by Fourier method, which is based on linear and stationary assumptions that do not fit the speech sound characteristics. The fact that we cannot percept sound based on Fourier analysis can also be understood based on the following technical reasons:

1. Fourier analysis is based on integral transform. Integral transform needs a finite window and subjects to the limitation of uncertainty principle.
2. Fourier spectra are unable to detect modulation: they fail to account for the periodicity of the envelopes, an important attribute of sound perception to explain envelope sound. Therefore, the puzzling 'missing fundamental phenomenon' and the perception of tone for sinusoidal modulated white noise have emerged.
3. Fourier analysis is unable to express 'chirp' sound from percussion instruments, because the sound is nonstationary.
4. Cochlear mechanism is driven by fluid dynamics; it is impossible to produce wave crests at the locations of all harmonics to satisfy the requirements for the tonotopic representation.
5. Harmonics are produced artificially by using a linear method to analyze nonlinear signals; they are mathematical artifacts not physical.
6. The existence of Surrogate data (Fourier spectrum with arbitrary phase) makes the Fourier spectral representation non-unique.

Because of the above limitations, the past analyses of speech have all put emphasis on the vowels. In fact, the meanings of our speeches are mostly carried by and vested in the consonants. The frequencies of these consonants are mostly higher than the fundamentals but in the frequency range of most harmonics. The inability to faithfully represent them in Fourier analysis, and ignoring them in the pitch formation perceptions are fatal flaws in our speech perception theory and in the hearing aid design principle.

BRIEF SUMMARY OF THE INVENTION

The technical problem to be solved by the present invention is to provide a method and apparatus for sound enhancement. Through the present invention, the sound can be selectively amplified, and only the high-frequency consonants in the sound are amplified without the harmonics from the vowels, which effectively improves the clarity of the enhanced sound.

The present invention is based on HHT (Hilbert-Huang Transform), which is based on temporal analysis. The steps of Hilbert-Huang transform are as follows: using empirical mode decomposition (EMD) to decompose signals; obtaining a plurality of intrinsic mode function components (IMFs) of the signals; processing each IMF component by the Hilbert transformation or other proper methods, to get the time-frequency properties of the signals. In HHT, frequency is defined by the differential of the phase function rather than the integral transform in the Fourier transform. There are no harmonics.

The steps of empirical mode decomposition are as follows:

(1) Finding the locations of all the extrema of the signal x(t) and interpolating (using local spline interpolation) between all the minima (or maxima) to obtain the lower (or upper) envelope connecting the minima $e_{min}(t)$ (or the maxima $e_{max}(t)$);

(2) Computing the local mean $m(t)=(e_{min}(t)+e_{max}(t))/2$ and subtracting the local mean from the loop variable x(t) to obtain the proto-IMF: h(t)=x(t)−m(t);

(3) Setting $IMF_m$=h(t) if h(t) satisfies the stopping criterion for EMD (zero mean, and the number of the extrema equals to zero crossings); else setting x(t)=h(t) and going to step (1) until the difference after the $k^{th}$ iteration becomes an IMF component, recording $c_1(t)=h_{1,k}(t)$;

(4) Subtracting the so derived IMF from the variable x(t) to obtain the residual $r_1(t)$, so that $x(t)-c_1(t)=r_1(t)$ and going to step (1);

(5) Stopping the sifting process when the residual from step (4) becomes a monotonic function that would be the trend $r_N(t)$.

The original signal x(t) is decomposed into:

$$x(t) = \sum_{n=1}^{N} c_n(t) + r_N(t).$$

The IMF components need to meet the following two conditions: (1) the number of local extreme points and zero crossings must be equal or differ by at most one; and (2) at any time, the local mean approaches zero.

The Hilbert transform H[x(t)] of the given signal x(t) is expressed as:

$$H[x(t)] = \frac{1}{\pi} \int_{-\infty}^{+\infty} \frac{x(\tau)}{t-\tau} d\tau.$$

Frequency is defined by the differential of the phase function rather than integral transform in Fourier type of analysis. Other method such as direct quadrature or inverse of arc-cosine can also be used to get the frequency values. HHT is designed for analyzing nonlinear and nonstationary data, a perfect match for sound analysis. But even this instantaneous frequency could not represent the 'periodicity' of the envelope resulting from modulation patterns. Huang et al (2016) and Huang and Yeh (2019) had further expanded the HHT into higher-dimensional Hilbert Holospectral representation, which can recover modulation (or envelope) frequencies. In this new approach, the frequencies of carriers and envelopes (also known as pitches) are defined and calculated rigorously. The Holo-spectral representation is designed for nonlinear data and is not affected by the mathematical artifacts of harmonics. At the same time, the Hilbert Holo-spectral representation is also designed for nonstationary data, which can represent transient consonants with high fidelity. More critically, it could reveal the modulation or periodicity patterns.

Having a detailed knowledge of the acoustic signal analysis, we decide to avoid the frequency space manipulation and make the new inventive method totally temporal based. This would save signal processing time and improve the clarity of the sound.

In order to achieve the foregoing purpose, the present invention provides a sound enhancement method, including the following steps:

(1) obtaining sound signals and converting the sound signals into digital signals;

(2) decomposing the digital signals by a mode decomposition method to obtain a plurality of Intrinsic Mode Function components (IMFs), wherein the IMFs represent amplitude changes of the digital signals converted from the sound signals at different frequencies over time;

(3) selectively amplifying the amplitudes of the IMFs obtained in step (2);

(4) reconstituting the selectively amplified IMFs to obtain reconstituted signals;

(5) converting the reconstituted signals into analog signals.

As a further improvement of present invention, the mode decomposition method includes Empirical Mode Decomposition (EMD), Ensemble Empirical Mode Decomposition (EEMD), Conjugate Adaptive Dyadic Masking Empirical Mode Decomposition (CADM-EMD).

As a further improvement of present invention, when the amplitudes of the IMFs are amplified in step (3), the amplification frequency band and the amplification factors are determined according to the hearing-impaired patient's audiogram.

As a further improvement of present invention, when the amplitudes of the IMFs are amplified in step (3), the IMFs in the frequency band of the consonants are selectively amplified.

In order to reduce signal processing time and cost, the present invention also provides another sound enhancement method, which includes the following steps:

(1) obtaining sound signals and converting the sound signals into digital signals;

(2) decomposing the digital signals by an adaptive filter bank to obtain a plurality of pseudo-Intrinsic Mode Function components (pseudo-IMFs), wherein the pseudo-IMFs represent the amplitude changes of the digital signals converted from the sound signals at different frequencies over time;

(3) selectively amplifying the amplitudes of the pseudo-IMFs obtained in step (2);

(4) reconstituting the selectively amplified pseudo-IMFs to obtain reconstituted signals;

(5) converting the reconstituted signals into analog signals.

As a further improvement of present invention, the adaptive filter bank is a mean filter bank.

As a further improvement of present invention, when the amplitudes of the pseudo-IMFs are amplified in step (3), the amplification frequency band and the amplification factors are determined according to the hearing-impaired patient's audiogram.

As a further improvement of present invention, when the amplitudes of the pseudo-IMFs are amplified in step (3), the pseudo-IMFs in the frequency band of the consonants are selectively amplified.

As a further improvement of present invention, any of the two above-mentioned sound enhancement methods can be applied to a hearing aid, a telephone, a conference call broadcast or any sound transmitting and reproducing device.

In another aspect, the present invention provides a sound enhancement apparatus, which comprises a sound receiving module, a sound enhancement module and a sound playback module; wherein the sound receiving module is used to receive sound signals and convert the sound signals into digital signals;

the sound enhancement module is used to process the digital signals to obtain a plurality of Intrinsic Mode Function components (IMFs) or pseudo-IMFs, selectively amplify the amplitudes of the obtained IMFs or pseudo-IMFs, reconstitute the selectively amplified IMFs or pseudo-IMFs to obtain reconstituted signals, and convert the reconstituted signals into analog signals to obtain enhanced sound signals;

the sound playback module is used to play the enhanced sound signals.

As a further improvement of present invention, the sound enhancement module includes an adaptive filter bank, an enhancement unit and a reconstituting unit; wherein the adaptive filter bank is used to decompose the digital signals to obtain the IMFs or pseudo-IMFs;

the enhancement unit is used to selectively amplify the amplitudes of the IMFs or the pseudo-IMFs;

the reconstituting unit is used to reconstitute the amplified IMFs or pseudo-IMFs to obtain the enhanced sound signals.

As a further improvement of present invention, the sound enhancement module further includes a tuning unit of gain values, which is used to determine the amplification factors of the sound signal amplitudes needed by a hearing-impaired patient in different frequency bands according to the patient's audiogram, or determine the amplification factors according to the frequency band of the consonants; and then the enhancement unit amplifies the amplitudes of the IMFs or pseudo-IMFs according to the tuning unit of gain values.

As a further improvement of present invention, the adaptive filter bank includes a mode decomposition filter bank and a mean filter bank.

As a further improvement of present invention, the sound enhancement apparatus can be applied to a hearing aid, a telephone, a conference call broadcast or any sound transmitting and reproducing device.

There has always been a misunderstanding of sound, and it is believed that all sound signals can be decomposed into sine waves, that is, sounds are represented by Fourier frequencies. The invention overcomes the false knowledge in sound analysis, and analyzes sound signals in the time domain based on Hilbert-Huang transform. By using the sound enhancement method and the sound enhancement apparatus in the present invention, sound, especially from speech, can be selectively amplified, and only the consonants with higher frequencies in the sound are amplified, which effectively improves the clarity of the amplified sound.

BRIEF DESCRIPTION OF THE DRAWINGS

FIG. 3 is the Fourier spectrograms for the low A sound.

FIG. 4 is the Morlet wavelet spectrograms for the low A sound.

FIG. 5 is the Hilbert Time-frequency spectrum for the low A sound.

DETAILED DESCRIPTION OF THE INVENTION

In the following, with the reference to the accompanying drawings and the preferred embodiments of the present invention, the technical means adopted by the present invention to achieve the intended purpose of the present invention will be further explained.

Figure 1:
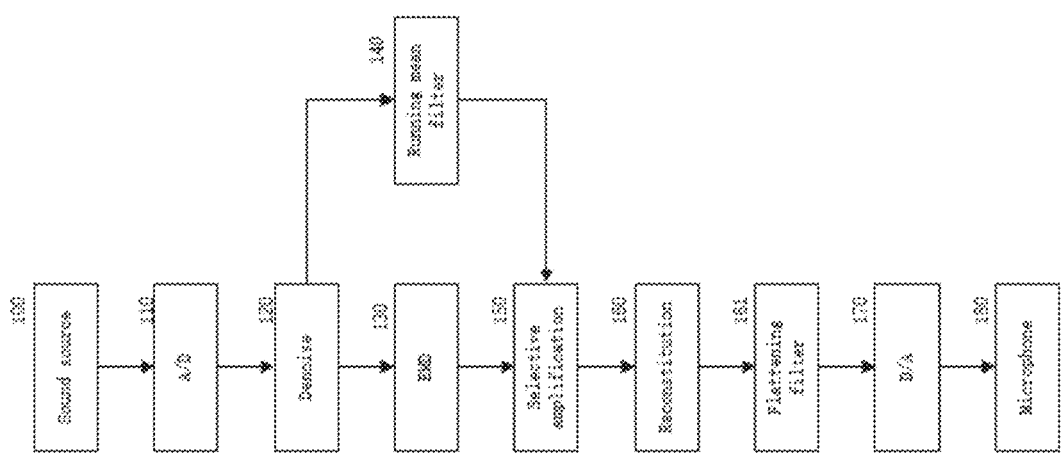
FIG. 1 is a flowchart of the process from sound generation to enhancement to playback in the present invention.
Figure 2:
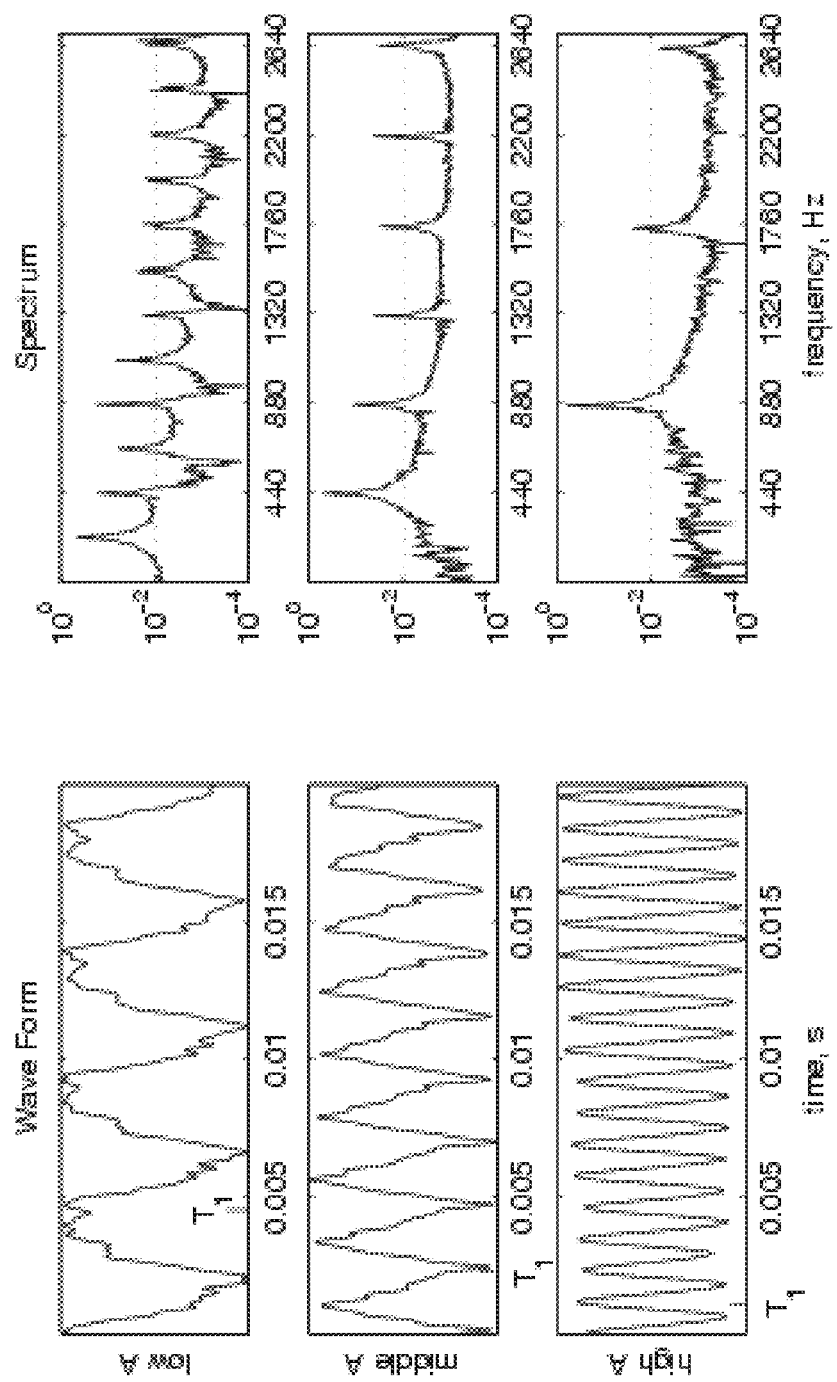
FIG. 2 is the wave forms and Fourier spectra from the sounds of low A, medium A and high A from a piano. The low A sound is used as a demonstration. Notice the numerous harmonics from the non-sinusoidal wave forms.

As shown in FIG. 1, a sound enhancement method is disclosed in an embodiment of the present invention. In step 100, a sound signal from a sound source is received. The incoming sound is digitized at a certain sampling rate (step 110). To reduce processing cost and depending on the need, the sampling rate could be reduced to 10,000 or even 6,000 Hz. Of course, for extra high fidelity, 22 kHz or the full 44 kHz sampling rate is also possible. This signal could be cleansed by an EMD or median filter to remove spiky noise (step 120). Then the signal is decomposed by EMD (step 130) or successive running mean filter (step 140) to obtain the IMFs and pseudo-IMFs of the sound signal. The mode decomposition method refers to any mode decomposition method that can obtain the Intrinsic Mode Function components (IMFs) of the signal. The mode decomposition method includes Empirical Mode Decomposition (EMD), Ensemble Empirical Mode Decomposition (EEMD), Conjugate Adaptive Dyadic Masking Empirical Mode Decomposition (CADM-EMD). Still further, the EMDs could be used together with improved signal decomposition methods based on them, such as successive running mean filter, to obtain the pseudo-IMFs. The obtained IMFs or pseudo-IMFs represent amplitude changes of sound data at different frequency scales over time. We can selectively amplify the high frequency components depending on the hearing-impaired patient's condition (step 150) and reconstitute the signal (step 160). It should be noted that a flattening filter might be required here (step 161), for too large amplification factor in step 160 could cause clipping of the signal and make the reconstituted sound rough. In step 170, the digital signal is converted into an analog signal (ie, a sound signal), and the sound is played back to the hearing-impaired patient through a speaker (step 180).

In order to better explain the sound enhancement method of the present invention, we first take the mode decomposition method as an example. First, a sound signal from a sound source is received (step 100), and the sound signal is digitized (step 110). To save time, the incoming sound is digitized at 22 kHz (step 110). The sampling rate is determined based on the following considerations. In speech, vowels and voiced consonants are dominated by vocal cord vibration frequency, which forms the so call fundamental, Fo. The frequency of Fo ranges from 80 to 400 Hz for a deep male voice to a child. While speech can contain spectral information up to 10 kHz, even the Fourier spectral information necessary for distinguishing different consonants and vowels is largely residing below 3000 to 5000 Hz, because many spectrums consist mostly of harmonics that could have much higher frequencies than the actual sound signals. In terms of Hilbert spectral representation without the artificial harmonics, the instantaneous frequency of many sound signals rarely exceeds 1,000 Hz (to be discussed in details later). Therefore, the sampling rate at 22 kHz is sufficient. To further reduce processing cost, the sampling rate could be reduced to 10,000 or even 6,000 Hz. Of course, for extra high fidelity, the full 44 kHz sampling rate is also possible.

This signal could be cleansed by an EMD or median filter to remove spiky noise (step 120). Then the signal is decomposed by EMD (step 130) to obtain the IMFs, $$x(t) = \sum_{j=1}^{N} c_j(t) + r_N(t) \tag{1}$$

with x(t) as the original signal, $c_j(t)$ are the Intrinsic Mode Function (IMF) components and $r_N(t)$ is the residual. The properties of the IMFs are orthogonal and the components are dyadically ranked in time scales. The first IMF component typically consists of 3-point oscillations. As the EMD is almost a bank of filter with dichotomic frequency increases, by the time we reach the 5th IMF component, the oscillation should consist of mean wavelength of the order of 48 points. For data with a sampling rate of 22 kHz, this component is equivalent to the frequency of 450 Hz already.

We should stop long before this point depending on the patient's condition. For example, for a signal digitized at 22 kHz, the mean frequency for the first 5 components will be $c_1(t)$: 3-points ~7,000 Hz $c_2(t)$: 6-points ~3,500 Hz $c_3(t)$: 12-points ~1,800 Hz $c_4(t)$: 24-points ~900 Hz $c_5(t)$: 48-points ~450 Hz         (2)

We can selectively amplify the high-frequency components depending on the patient's condition irrespective of the underlying frequency values (step 150) and reconstitute the signal as y(t) (step 160):

$$y(t) = \sum_{j=1}^{4} a_j \times c_j(t) + \sum_{j=5}^{N} c_j(t) + r_N(t) \quad (3)$$

Since $r_N(t)$ represents the trend of sound, the frequency of $r_N(t)$ is very low and cannot be recognized, we ignore the residual and the reconstituted signal y(t) can be expressed as:

$$y(t) = \sum_{j=1}^{4} a_j \times c_j(t) + \sum_{j=5}^{N} c_j(t) \quad (4)$$

wherein $a_j$ is the amplification factor with each value determined individually according to the patient's audiogram test data to fit individual patient. Besides, the values of $a_j$ can be set according to the frequency band of the consonants. Most of the amplification should be selectively put on the high-frequency components, for those components actually represent the consonants that would add clarity to the sound. As most of the hearing-impaired patients should still be able to hear sounds up to around 500 Hz, for all practical purposes, amplification of the first 4 components should be sufficient, if the sound is digitized at 22 kHz. The reconstituted signal y(t) could be converted back to analog form (step 170) and be played back to the listener. It should be noted that a flattening filter might be required here (step 161), for too large amplification factor could cause clipping of the signal and make the reconstituted sound rough.

For higher degree of fidelity, the sampling rate could be set at 44 kHz. In that case, the first IMF component will be 15 kHz, which might be left out to suppress the ambient noise. At any rate, we only have to amplify the first 5 IMF components to get to 450 Hz.

In order to illustrate the advantages of the sound enhancement method of present invention, in FIGS. 2 to 8, we have compared the Fourier spectra, Morlet wavelet spectra and Hilbert time-frequency spectra. By comparing the spectrograms of different methods, we will first demonstrate the details of the hearing mechanism using the examples of missing fundamental, which will serve to illustrate the failure of the current harmonic amplification approach.

Figure 3B:
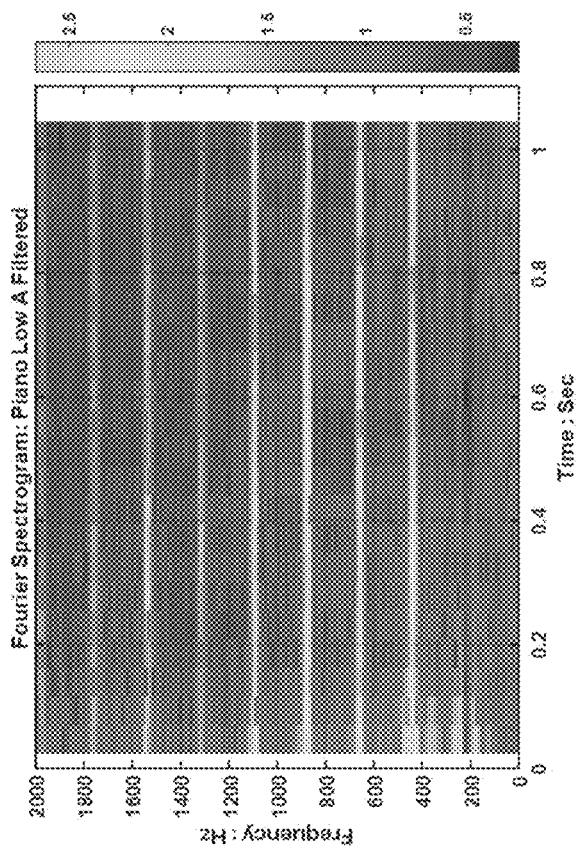
FIG. 3a is the Fourier spectrogram for the low A sound with the fundamental (at 220 Hz) and FIG. 3b is the Fourier spectrogram for the low A sound without the fundamental.
Figure 3A:
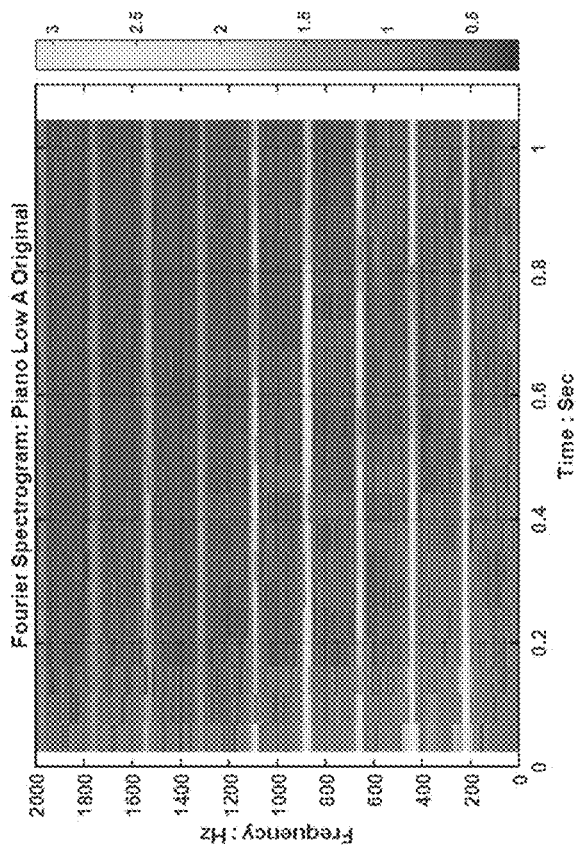
Figure 4B:
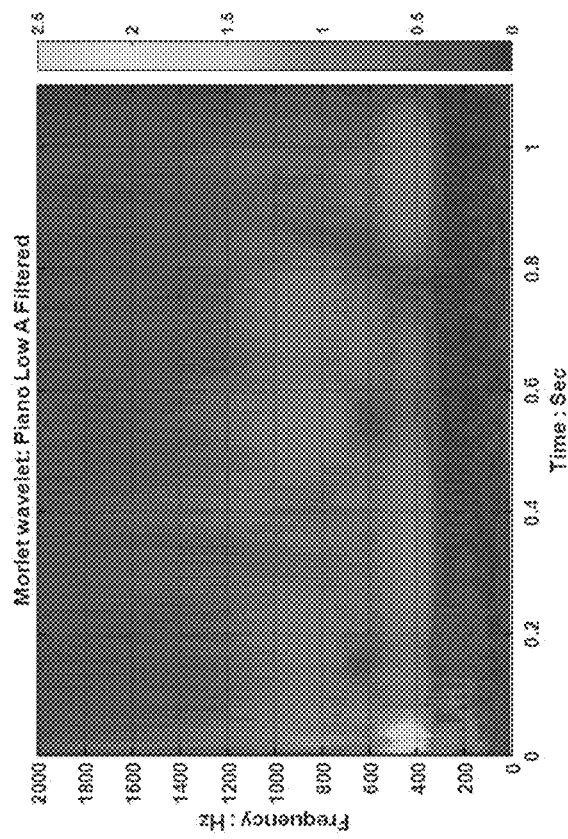
FIG. 4a is the Morlet wavelet spectrogram for the low A sound with the fundamental (at 220 Hz) and FIG. 4b is the Morlet wavelet spectrogram for the low A sound without the fundamental.
Figure 4A:
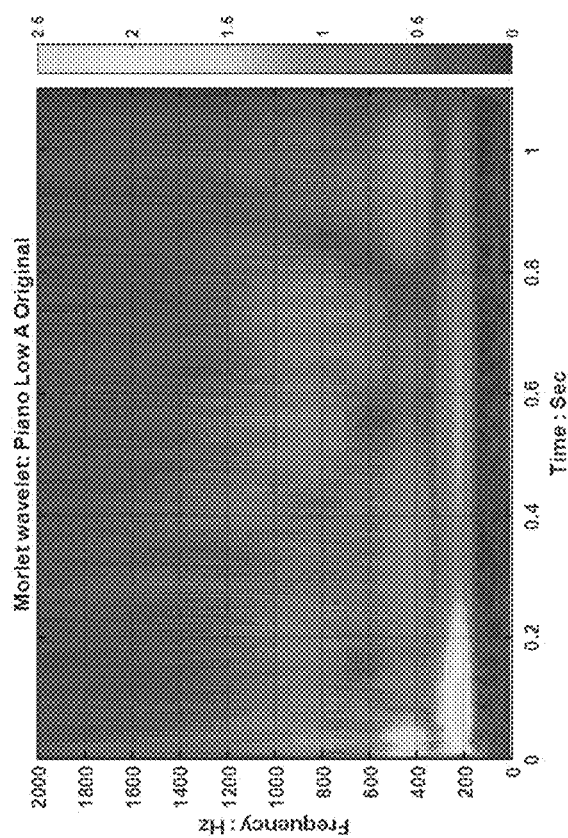
Figure 5B:
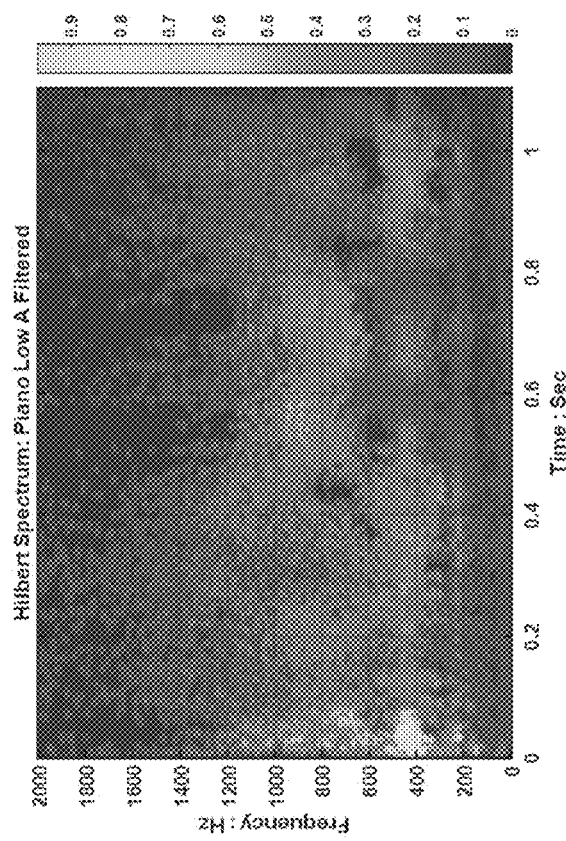
FIG. 5a is the Hilbert Time-frequency spectrum for the low A sound with the fundamental (at 220 Hz) and FIG. 5b is the Hilbert Time-frequency spectrum for the low A sound without the fundamental.
Figure 5A:
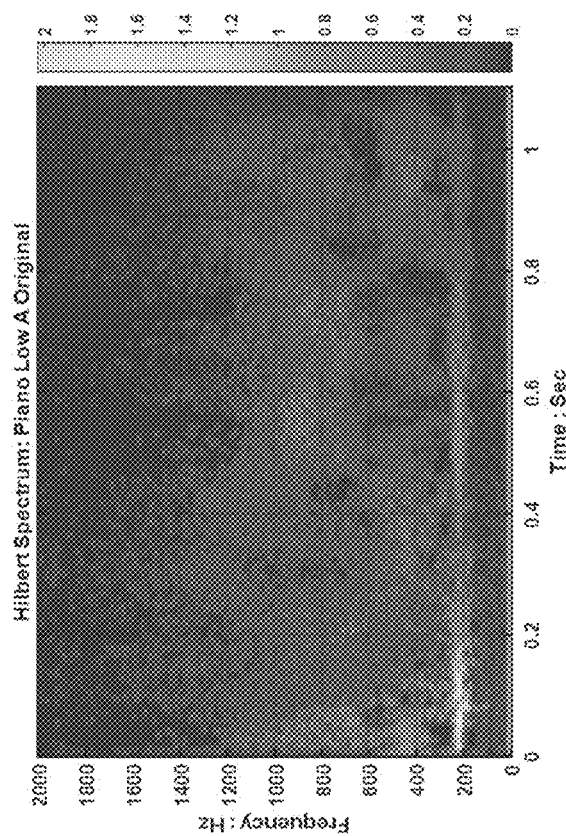

Let us examine the sound of low A from a piano (a percussion instrument). The waveform data of the low A, middle A and high A from the piano are given in FIG. 2 along with their corresponding Fourier spectra. Notice the distorted wave with non-sinusoidal forms in the signals on the left panels. The distorted wave forms would generate harmonics as shown in the accompanying Fourier spectra in the right panels. We will use the low A sound as our example here. FIGS. 3a and 4a show the Fourier spectrogram and Morlet wavelet spectrum comprising fundamental respectively. The fundamental can be removed by a notched filter but the filtered signal still is perceived as the fundamental sound, after the removal of the fundamental. The Fourier spectrogram and wavelet spectrum (FIGS. 3b and 4b) indeed both show the case without fundamental. Compared with FIG. 3a, fundamental is absent in FIG. 3b, bur after each of the two is converted into a sound signal, the two sound signals sound the same. The same is true for FIG. 4a and FIG. 4b. Thus, we have the puzzle of missing fundamental. If we switch to the adaptive HHT analysis, FIGS. 5a and 5b show the Hilbert spectra with and without the fundamental, respectively. The Hilbert spectrum result still shows the existence of a faint fundamental after removing the fundamental in FIG. 5b, but this weak energy density could not explain why the listener can hear the sound. It has been long recognized that the perceived sound actually came from the periodicity of the envelope. Unfortunately, there is no traditional tool to determine the frequency content of the envelope rigorously and objectively. As a result, the perceived sound is currently defined solely by subjective 'pitch'.

Figure 6:
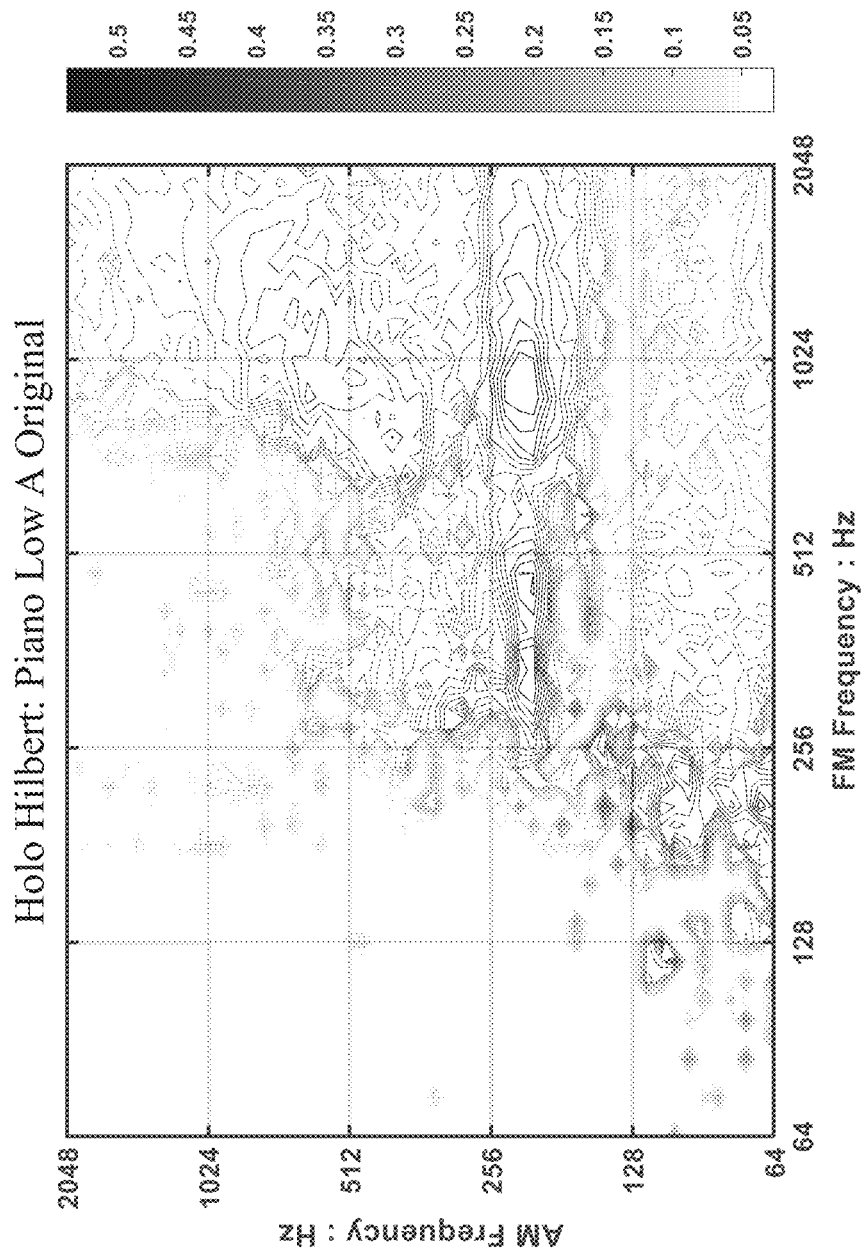
FIG. 6 is the Hilbert Holo-spectrum of the low A sound with the fundamental (at 220 Hz).
Figure 7:
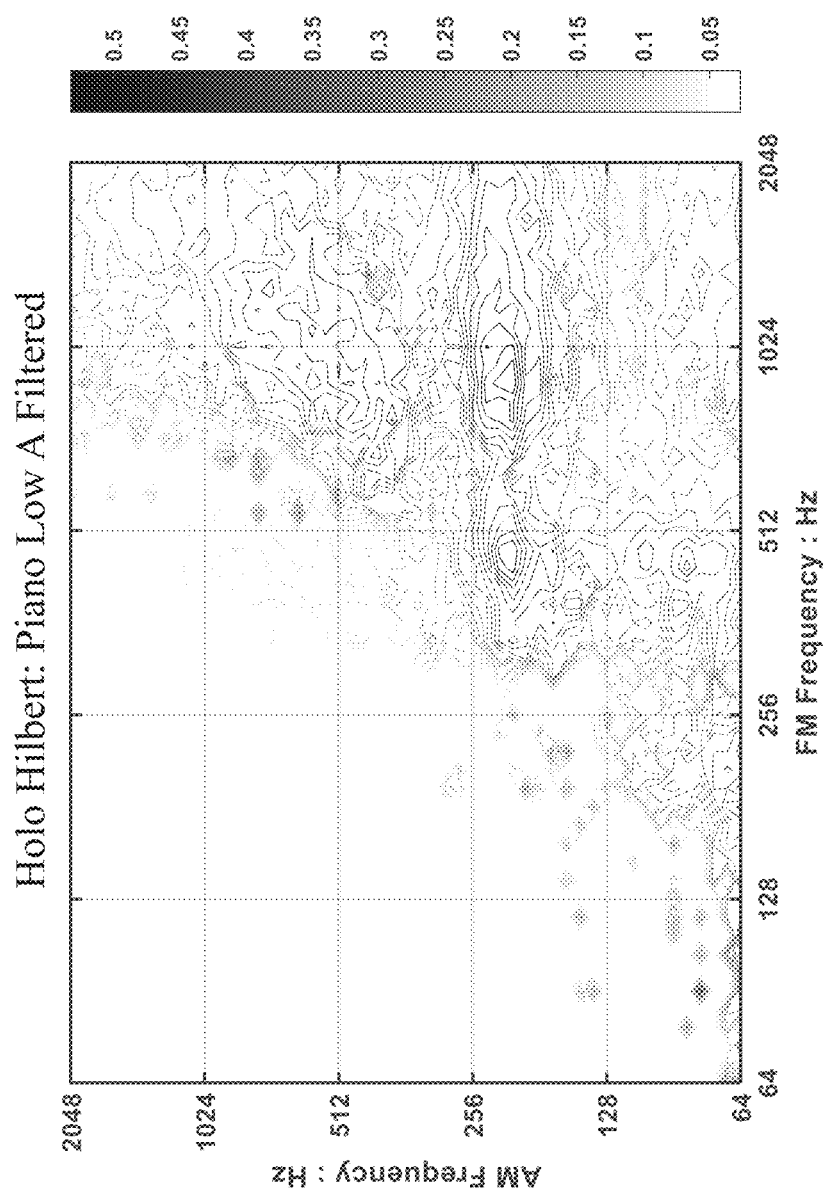
FIG. 7 is the Hilbert Holo-spectrum of the low A sound without the fundamental (at 220 Hz).
Figure 8:
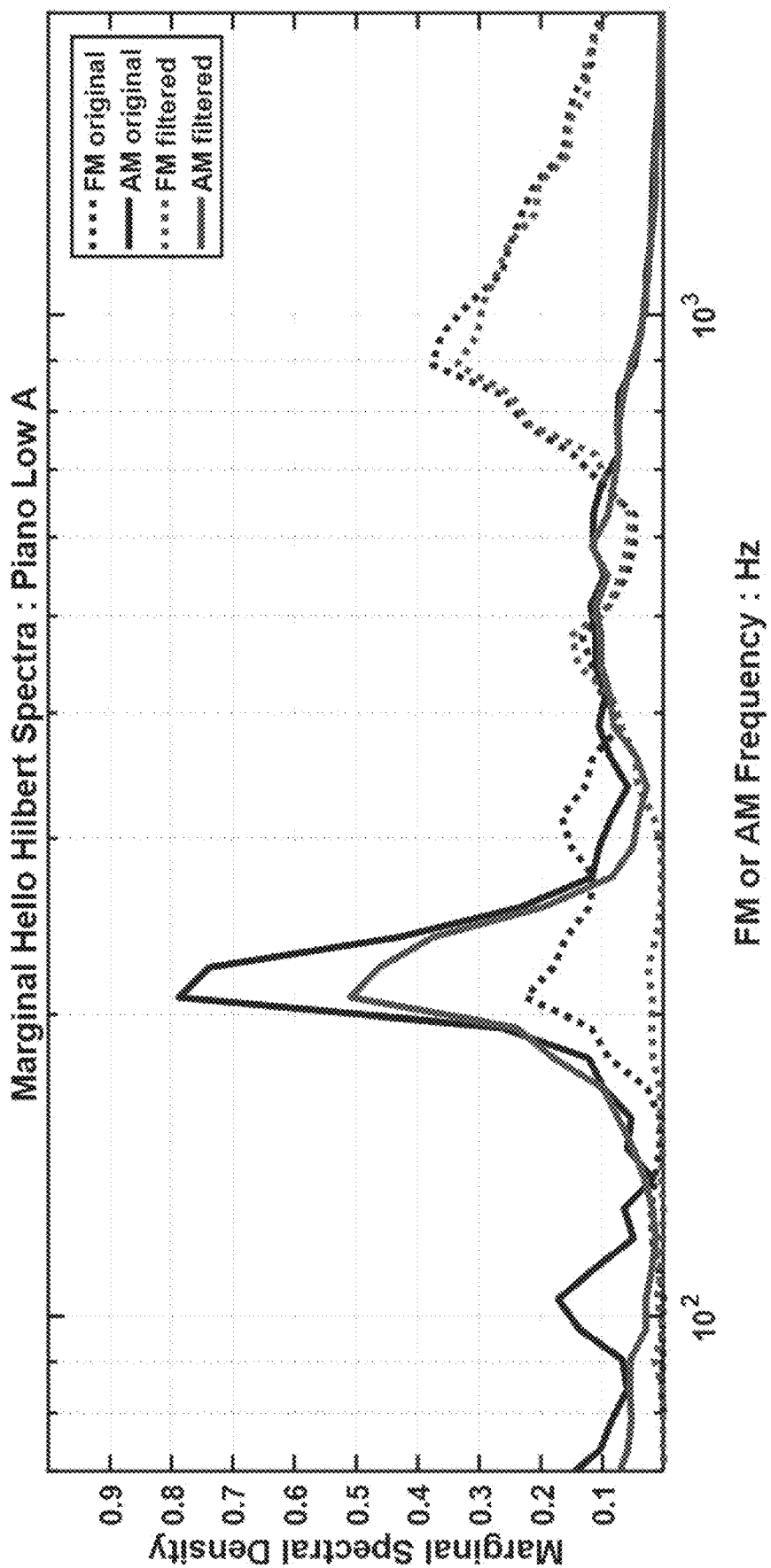
FIG. 8 is the marginal spectra from FIGS. 6 and 7.

Recently, Huang et al introduced Hilbert Holo-spectral analysis. More specifically, Huang and Yeh introduced a whole set of tools to analyze the acoustic signal pertaining to hearing. If we use the newly developed Holo-spectral representation, the spectra with and without the fundamental in the sound are given in FIGS. 6 and 7, respectively. FIG. 6 shows the Holo-spectrum of the Low A sound with the fundamental. Notice a strong modulating AM frequency around 220 Hz covering almost all FM frequency range. There is also a strong FM around 220 Hz. FIG. 7 shows the Holo-spectrum of the Low A sound without the fundamental. Notice a strong modulating AM frequency around 220 Hz covering almost all FM frequency range still remains. The strong FM around 220 Hz is missing now that indicates the missing fundamental in the filtered data. We further compute the marginal Holo-spectra from both FIGS. 6 and 7, and the result is given in FIG. 8. The AM energy densities in both cases are the dominant ones, even with the fundamental missing. Here the dominance of the modulation frequency is clearly shown for the cases with or without the fundamental, even though in the FM projection the fundamental is missing in the filtered data. The dominant frequency of either FM or AM is the perceived sound. Thus, we have demonstrated the prowess of HHT in acoustic signal analysis, and the effect of missing fundamental of amplifying the fundamental by the sum of harmonics.

However, for speech analysis, the full 4-dimensional time dependent Hilbert Holo-spectral representation is too complicate and unwieldy. The simplified time-dependent Instantaneous frequency-based Hilbert spectral and the AM Time-Frequency Hilbert spectral analysis would be sufficient for the present invention. But even that is still too time consuming. The present invention is based on temporal operation only.

Figure 9:
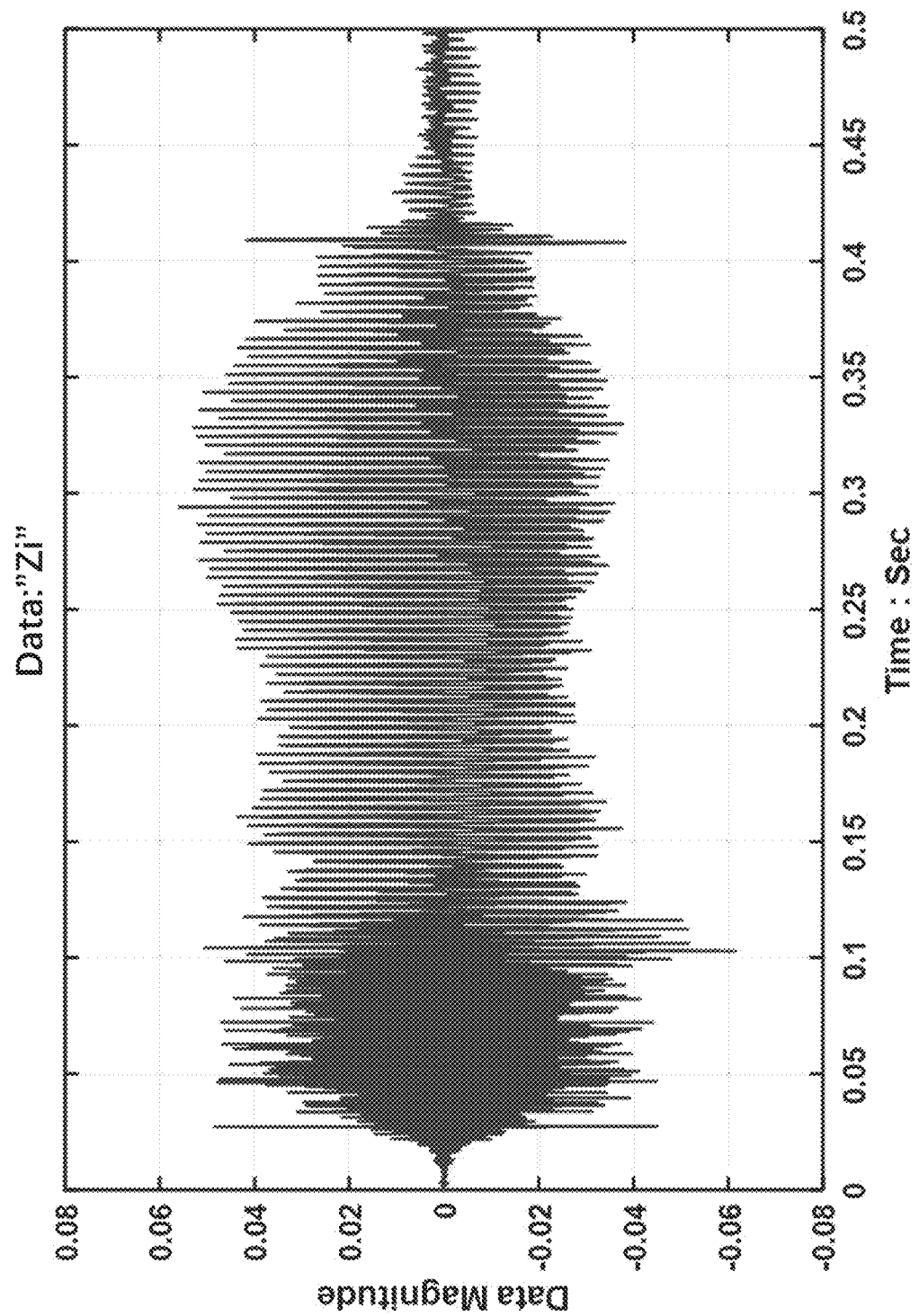
FIG. 9 is the data from the sound of 'zi'; in Chinese Roman phonetic, 'z' is an unvoiced consonant, followed by the vowel 'i'.

The actual implement is further demonstrated in the following example of an un-voiced sound, 'zi', pronounced according to the Chinese Roman Phonetic system. The data is given in FIG. 9, which is the data from the sound of 'zi', wherein 'z' is an unvoiced consonant, followed by the vowel 'i'. In fact, it should be noted that the Chinese language contains some of the highest frequency un-voiced sounds (such as z, c, s and j, q, x) that give the hearing aid design special challenge such as the one shown in this example.

Figure 10:
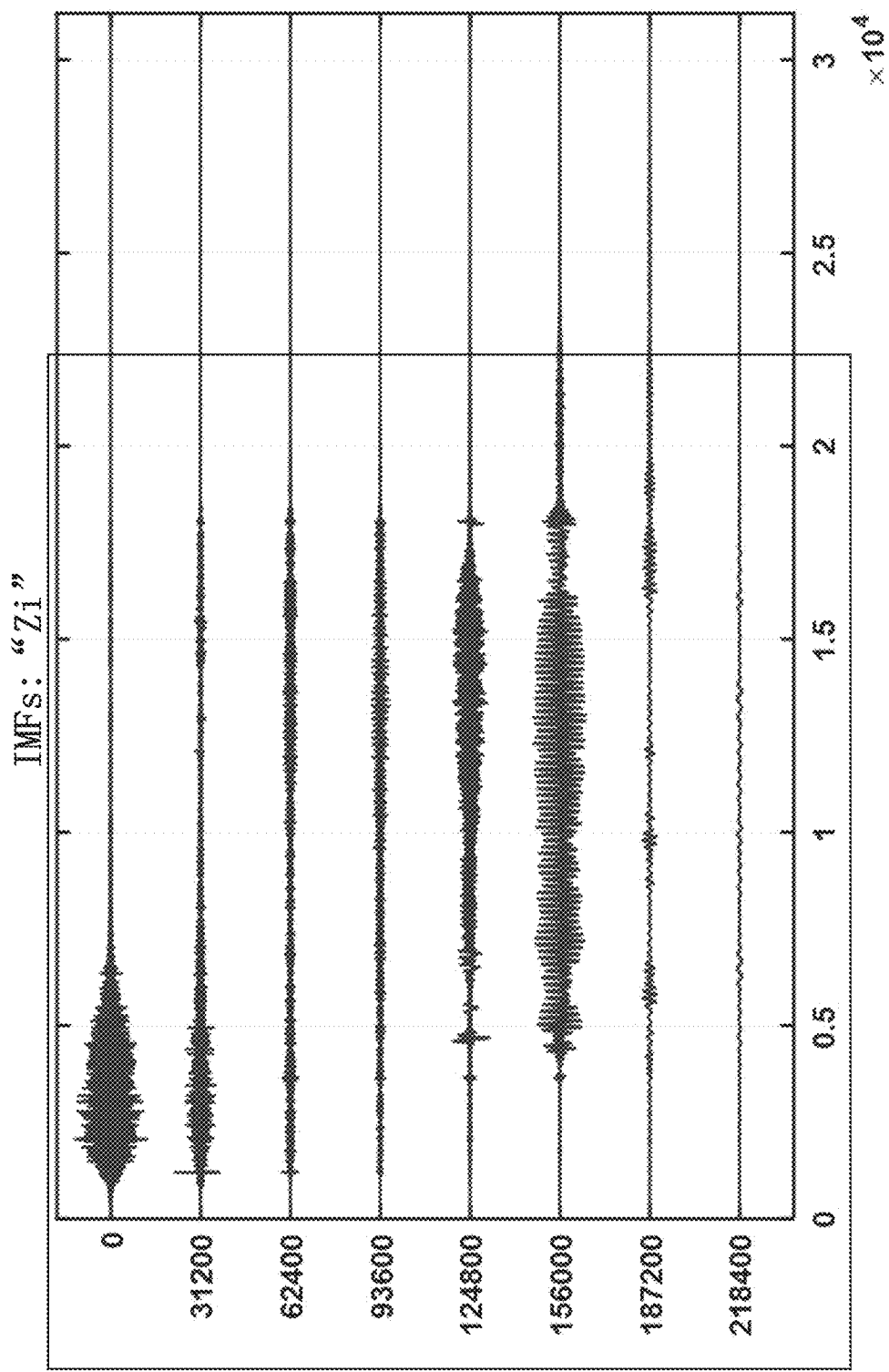
FIG. 10 is a diagram of the IMF components of the sound data given in FIG. 9.

The data is decomposed by EMD. The result is given in FIG. 10, which is a diagram of the IMF components of the data given in FIG. 9. Notice the high frequency components in the first few IMFs mostly stand for the sound of 'z', especially IMF 1 and 2. The block area shows the time period covered by the data given in FIG. 9.

Figure 11:
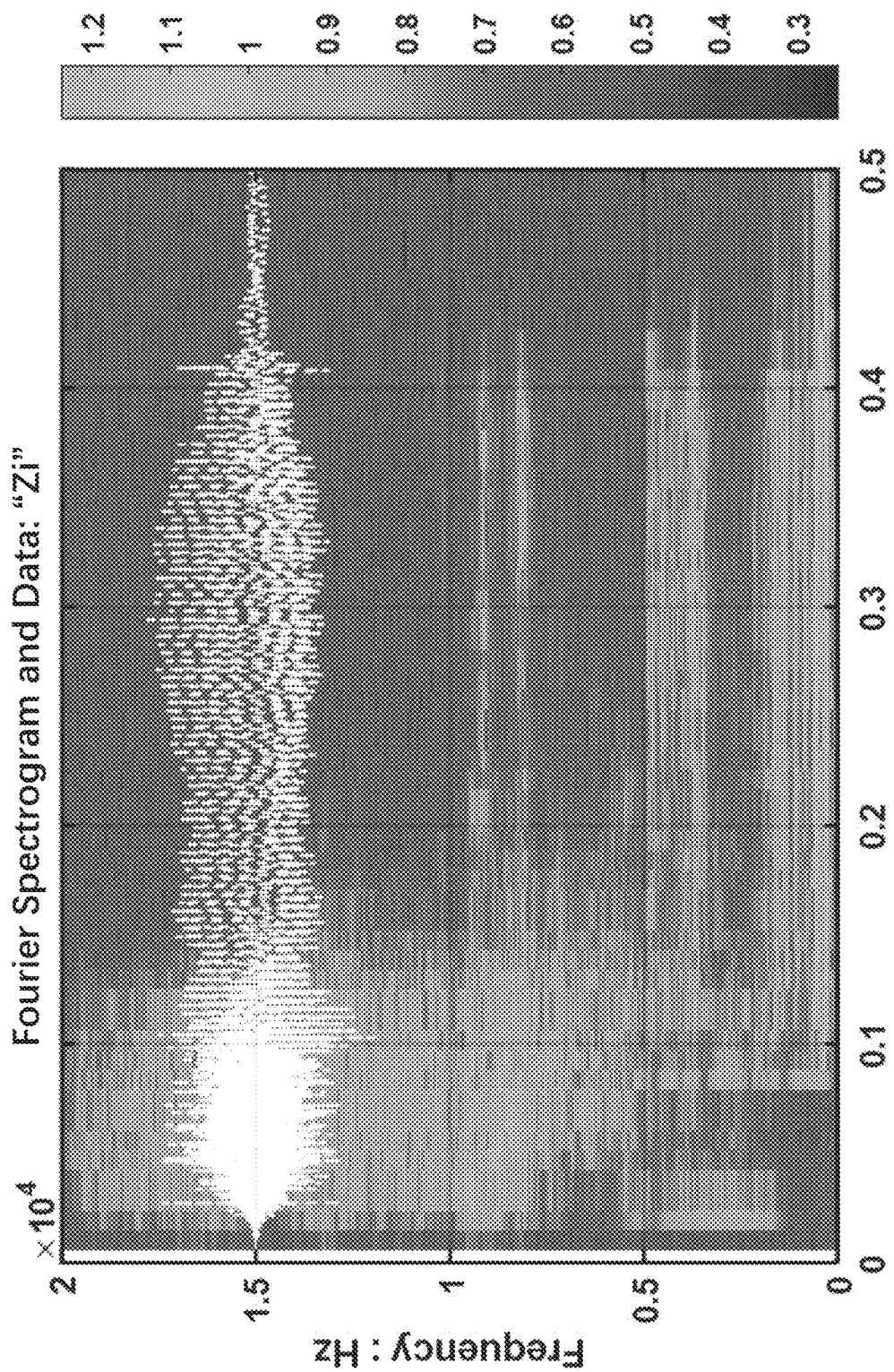
FIG. 11 is the Fourier spectrogram of the sound 'zi' with the sound signal superimposed.

FIG. 11 is the Fourier spectrogram of the sound 'zi' with the signal superimposed. In the first 0.15 seconds, the sound is 'z', which is of very high frequency starting from near 8000 Hz and almost reaching 20,000 Hz. The vowel part starts later and is full of harmonics. There are dense fine harmonics within the first 2000 Hz range. Then, there are other high energy density zones at around 4,000 to 5,000 Hz, and 8,000 to 10,000 Hz. With all the drawbacks of the Fourier analysis when applied to nonlinear and nonstationary data, we will make a comparison of the HHT based Hilbert spectral analysis results in FIG. 12.

Here, the same high frequency energy density for 'z' sound remains; however, the harmonics for the vowel at 8,000 Hz are absent. The energy at 4,000 Hz is not harmonics of any sound, but the reflection of the voice in the vocal tract. The absence of any harmonic at high frequency range leaves only the consonants, which provides us a unique opportunity to amplify the consonants without altering the sound of the vowel part. This is the key technology of this invention. We can amplify the first few IMFs without influencing the vowels (step 150) according to formula given in Equation (4). This is especially true for the IMF 1 and 2.

Figure 13:
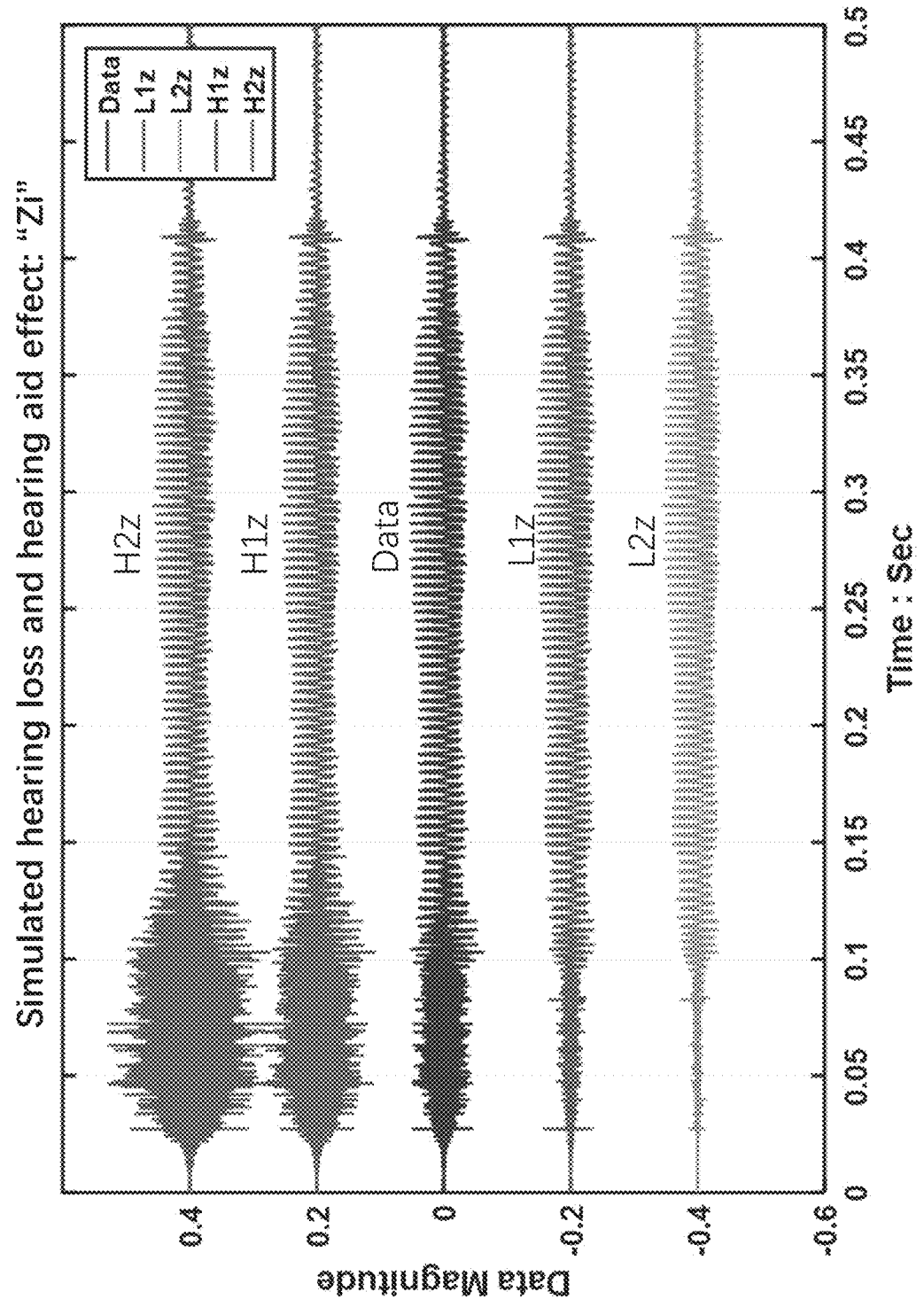
FIG. 13 is a comparison of the reconstituted signals of the sound 'zi' after amplification or reduction of the high-frequency part.

FIG. 13 is a comparison of the reconstituted signals (step 160) after amplification or reduction. The amplificated signals (H1z and H2z) represent different amplification factors for the high frequency IMFs, which illustrate the individualized selective amplification effects of the new inventive hearing aid on different patients. Compared to the original signal, we can see the amplification only amplifies the consonant part selectively but leaves the vowel part unchanged.

The reduced signals (L1z and L2z) simulate the hearing loss to various degrees. For presbycusis patients, the loss is usually only in the consonant not the vowel part. Hearing aids with self-compensation mechanism currently on market would make sound louder but lacking clarity. Importantly, if one selectively amplifies harmonics in the range of 1,000 Hz to 4,000 Hz, it is effective to amplify the fundamentals without involving the consonant part. It is equivalent to amplifying L1z or L2z where the sound will become loud but the clarity will not be improved. The reconstituted signals could be converted back to analog form (step 170) for playing back through the hearing aid amplifier or microphone (step 180). For congenital hearing loss case, the amplification might be more important dependent on individual patient.

It should be pointed out that the principle in hearing aid design is 'selective amplification' of the sound. The Fourier approach of amplifying the range around 2,000 to 4,000 Hz effectively amplifies harmonics, which is tantamount to amplifying the fundamentals based on the missing fundamental phenomenon. But the fundamentals do not need amplification at all. Unfortunately, some consonants do not have harmonics, nor any tangible signals in and around 2,000 to 4,000 Hz range. The combined effects in Fourier approach actually amplify the audible vowels, equivalent to amplifying the signal L1z or L2z in FIG. 13. The patients would not gain any clarity benefit but only loudness, exactly the common complaint of the users of the current Fourier based hearing aids.

Alternative Implementations

Still further, to save time, the EMD could be substituted by, or using anything equivalent to, repeated applications of successive running means, median means, a separate group of band-pass filters, any filter that could separate the signals into high and low parts, high-pass filters with various window sizes according to the input signals, or other time domain filters. The steps should go like the follows. First decompose the data by successive running mean (or running median):

$$x(t) - \langle x(t) \rangle_{n1} = h_1(t), \quad (5)$$

$$\langle x(t) \rangle_{n1} - \langle\langle x(t) \rangle_{n1} \rangle_{n2} = h_2(t),$$

$$\langle\langle x(t) \rangle_{n1} \rangle_{n2} - \langle\langle\langle x(t) \rangle_{n1} \rangle_{n2} \rangle_{n3} = h_3(t),$$

...

$$\langle\langle\langle x(t) \rangle_{n1} \rangle_{n2} \rangle_{n3} \cdots \rangle_{N-1} - \langle\langle\langle x(t) \rangle_{n1} \rangle_{n2} \rangle_{n3} \cdots \rangle_N = h_N(t)$$

$$x(t) = \sum_{j=1}^{N} h_j(t) + \langle\langle\langle x(t) \rangle_{n1} \rangle_{n2} \rangle_{n3} \cdots \rangle_N$$

in which $\langle(x(t)\rangle_{nj}$ indicates the running mean filter of window size nj, which has to be an odd number. The $h_j(t)$ is any of the pseudo-IMFs produced by running filters. Furthermore, repeated applications of the boxcar actually change the filter response function remarked. For example, two repetitions would give a triangular response; four and more repetitions would give almost a Gaussian shape response. The key parameter of using such a filter is the window size. Based on the discussion in Equation (2), at 22 kHz sampling rate, we concluded that the following equivalence between the boxcar filter and EMD should exist:

$nj=3 \sim 7,000$ Hz $nj=7 \sim 3,500$ Hz $nj=15 \sim 1,500$ Hz $nj=31 \sim 700$ Hz $nj=61 \sim 350$ Hz  (6)

The disadvantage of the filter is that none of the filter is as sharp as EMD, a point we will return to later. The filter, however, could be used as a cheaper substitute for EMD.

The selective amplification could be implemented like in Equation (4) and the reconstituted signal y(t) be obtained as $$y(t) = \sum_{j=1}^{N} a_j \times h_j(t) + \langle\langle\langle x(t) \rangle_{n1} \rangle_{n2} \rangle_{n3} \cdots \rangle_N \quad (7)$$

in which the values of $a_j$ could be assigned according to the patient's audiogram test just as in Equation (4).

Figure 12:
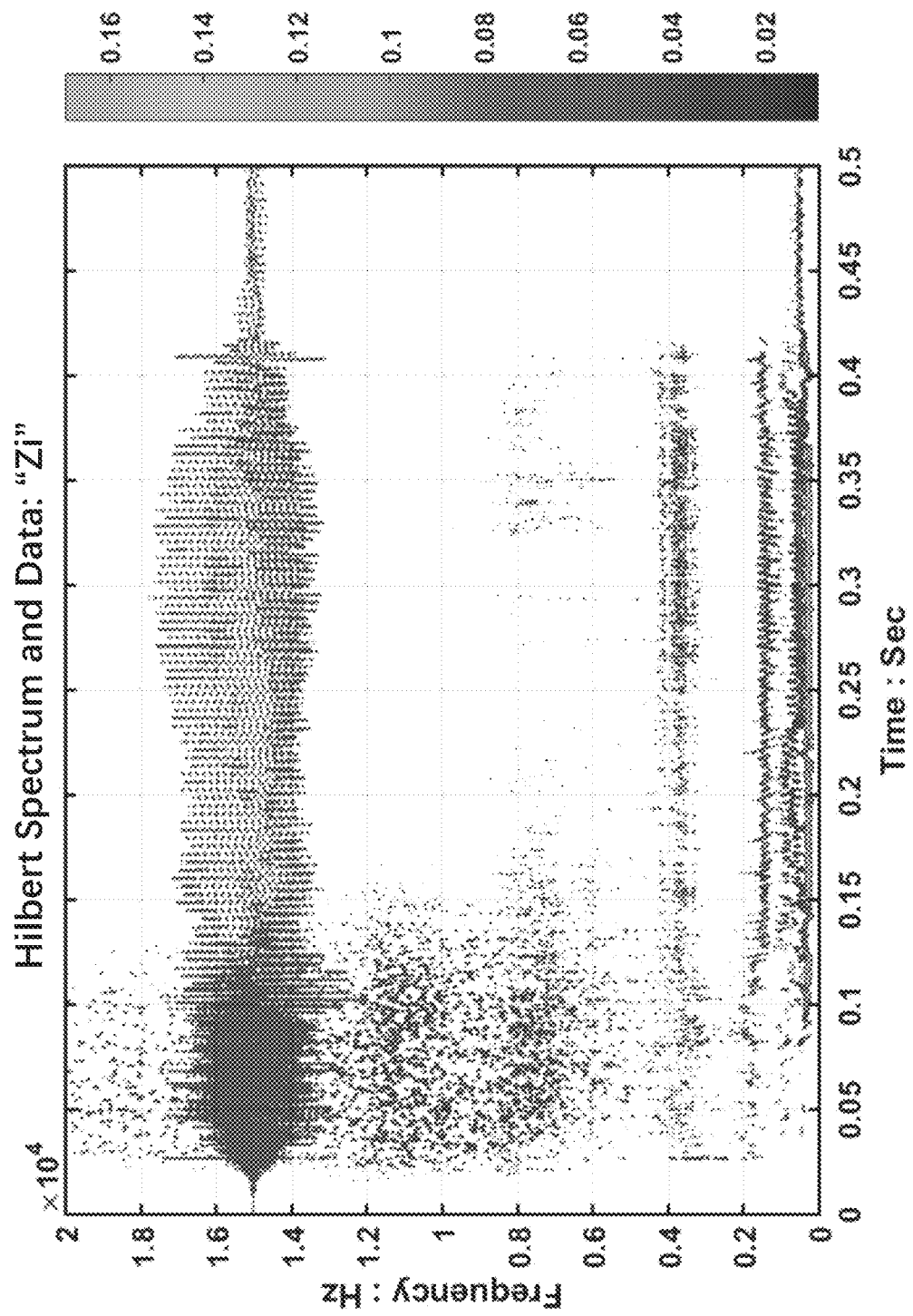
FIG. 12 is the Hilbert spectrum of the sound 'zi' with the sound signal superimposed.
Figure 14:
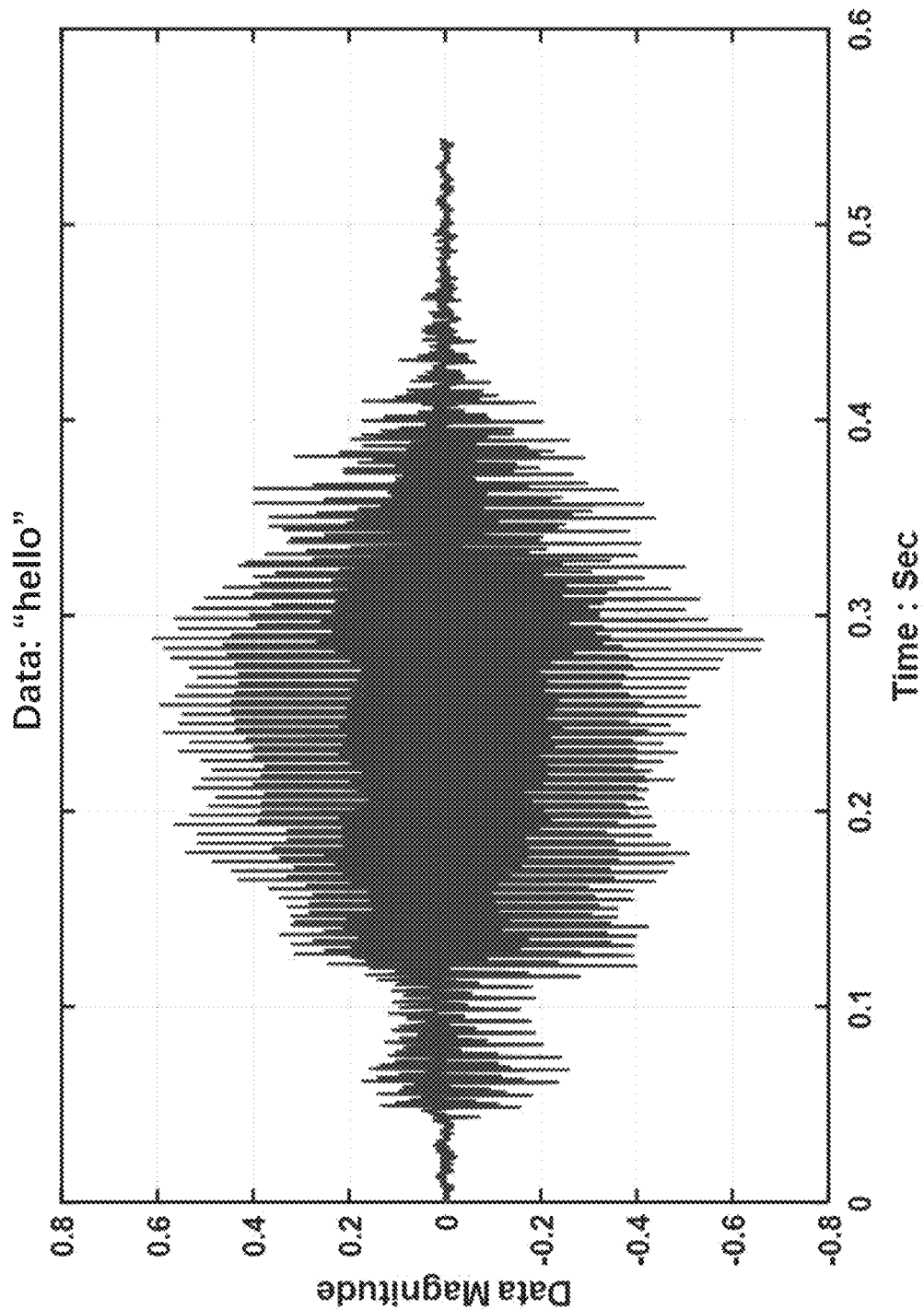
FIG. 14 is the data from the sound of 'hello'. Both 'h' and 'lo' are audible sounds.
Figure 15:
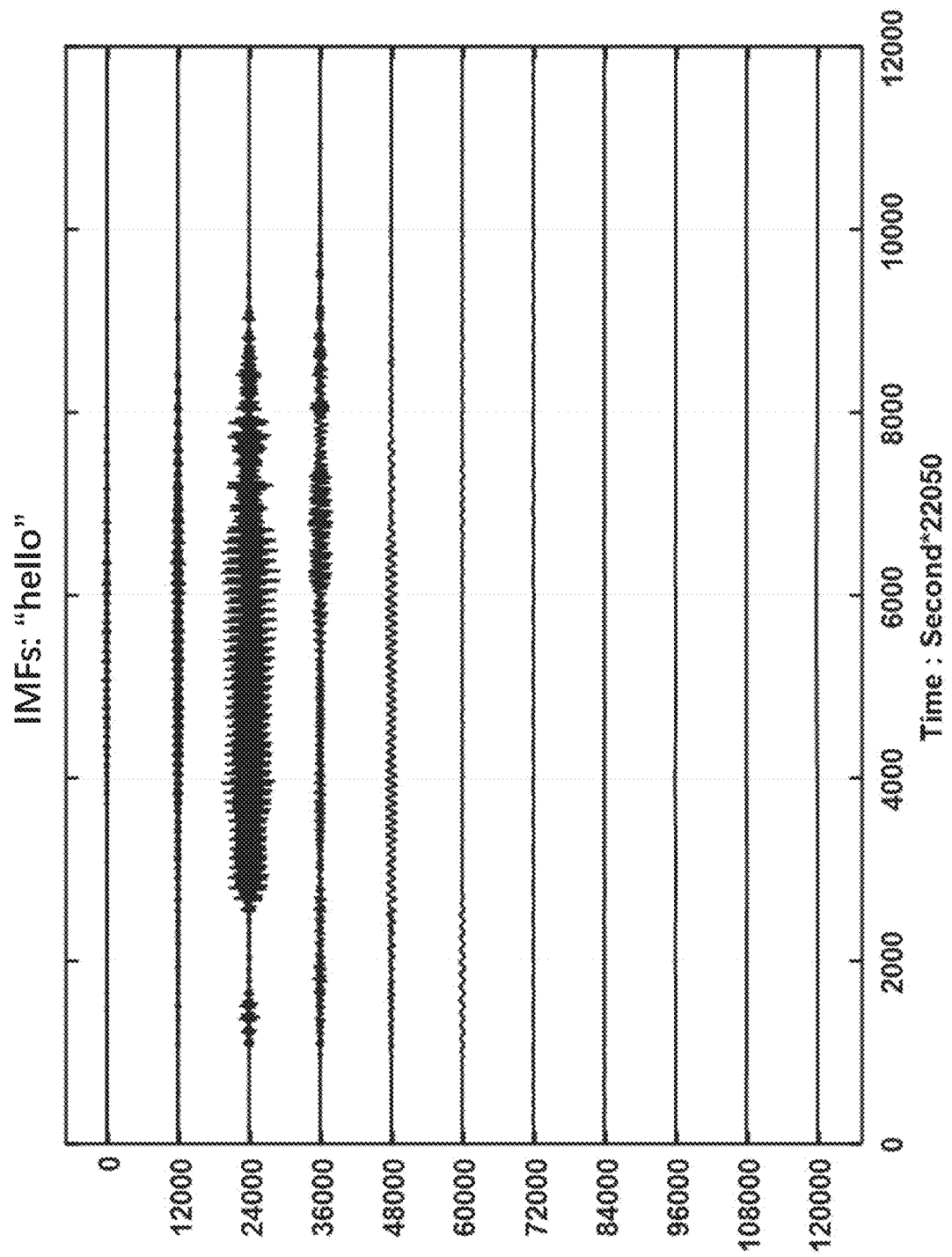
FIG. 15 is a diagram of the IMF components of the sound data given in FIG. 14.
Figure 16:
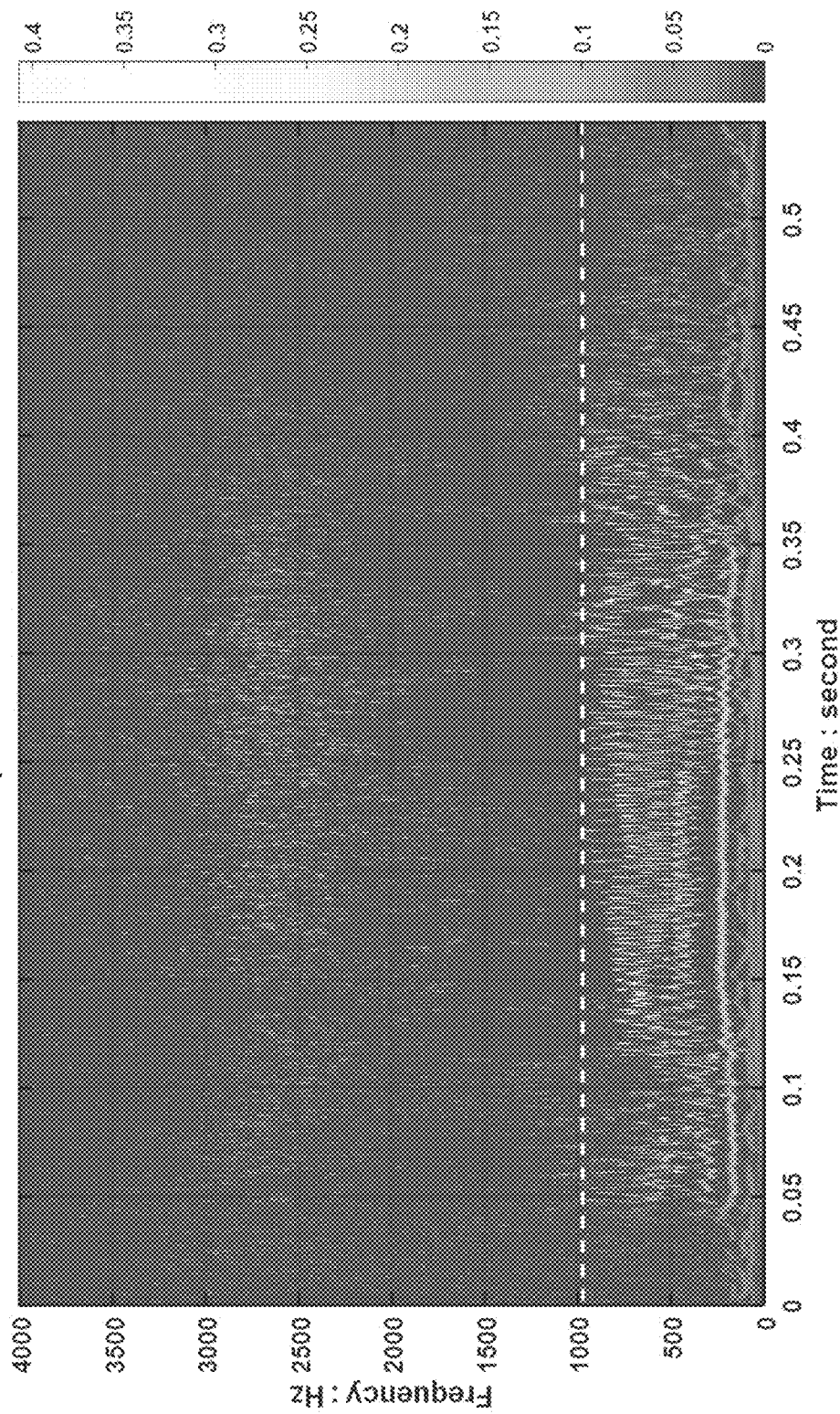
FIG. 16 is the Hilbert spectrum of the sound 'hello'.

In order to explain in detail, the application of alternative methods of EMD and the comparison between these alternative methods and EMD, we use the sound data 'hello' as an example. The digitized data of the sound 'hello' is given in FIG. 14, and both 'h' and 'lo' are audible sounds. The EMD decomposition data is given in FIG. 15. The most energetic IMF component is IMF3. There are two high frequency IMFs, IMF1 and IMF2. The Hilbert spectrum of the data is given in FIG. 16. The energy density along the 200 Hz signal represents the vibration of the vocal cords; the main energy density between 400 to near 1,000 Hz represents the resonant of the articulators. The high frequency energy between 2,000 and 3,000 Hz are the reflection from the vocal tract. It differs from people to people depending on the physical size and shape of the vocal tract of the speaker. For example, the reflection signal in FIG. 12 is much higher, around 4,000 Hz, indicates the speaker is of a smaller physical statue. These high frequency components would add to the timbre of the sound. Furthermore, it is noted that very little energy is above and beyond 1,000 Hz.

Figure 17:
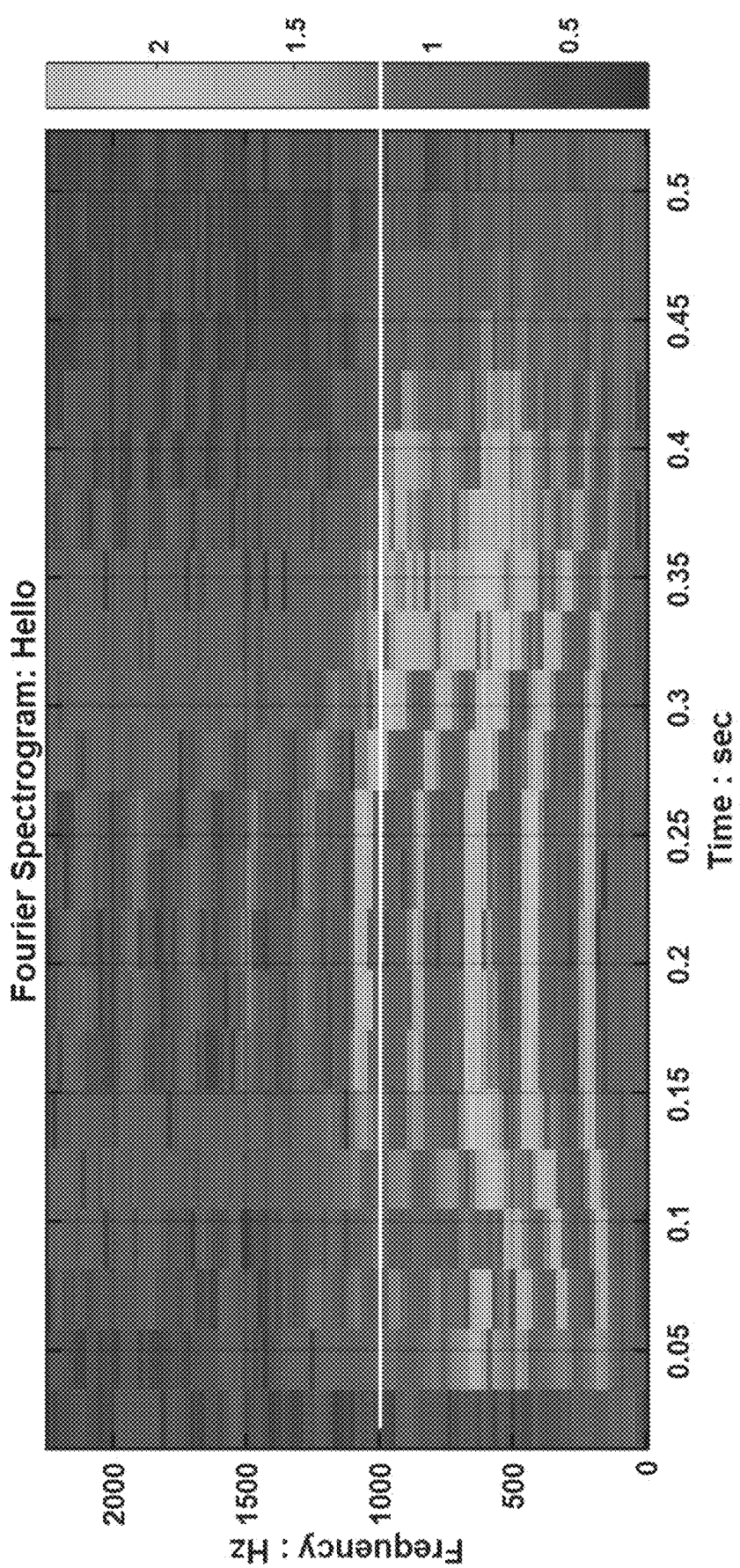
FIG. 17 is the Fourier spectrogram of the sound 'hello'.

FIG. 17 is the Fourier spectrogram of the sound 'hello'. It can be seen from the figure that it covers all harmonics in all frequency ranges. Based on the 'missing fundamental' phenomenon discussed above, amplification of the harmonics is tantamount to amplification of the fundamentals. Therefore, any attempt to amplify frequencies in this range in Fourier analysis would result in exactly what the phenomenon of missing fundamental had demonstrated. The result would be to make the sound louder, but without increasing clarity.

Figure 18A:
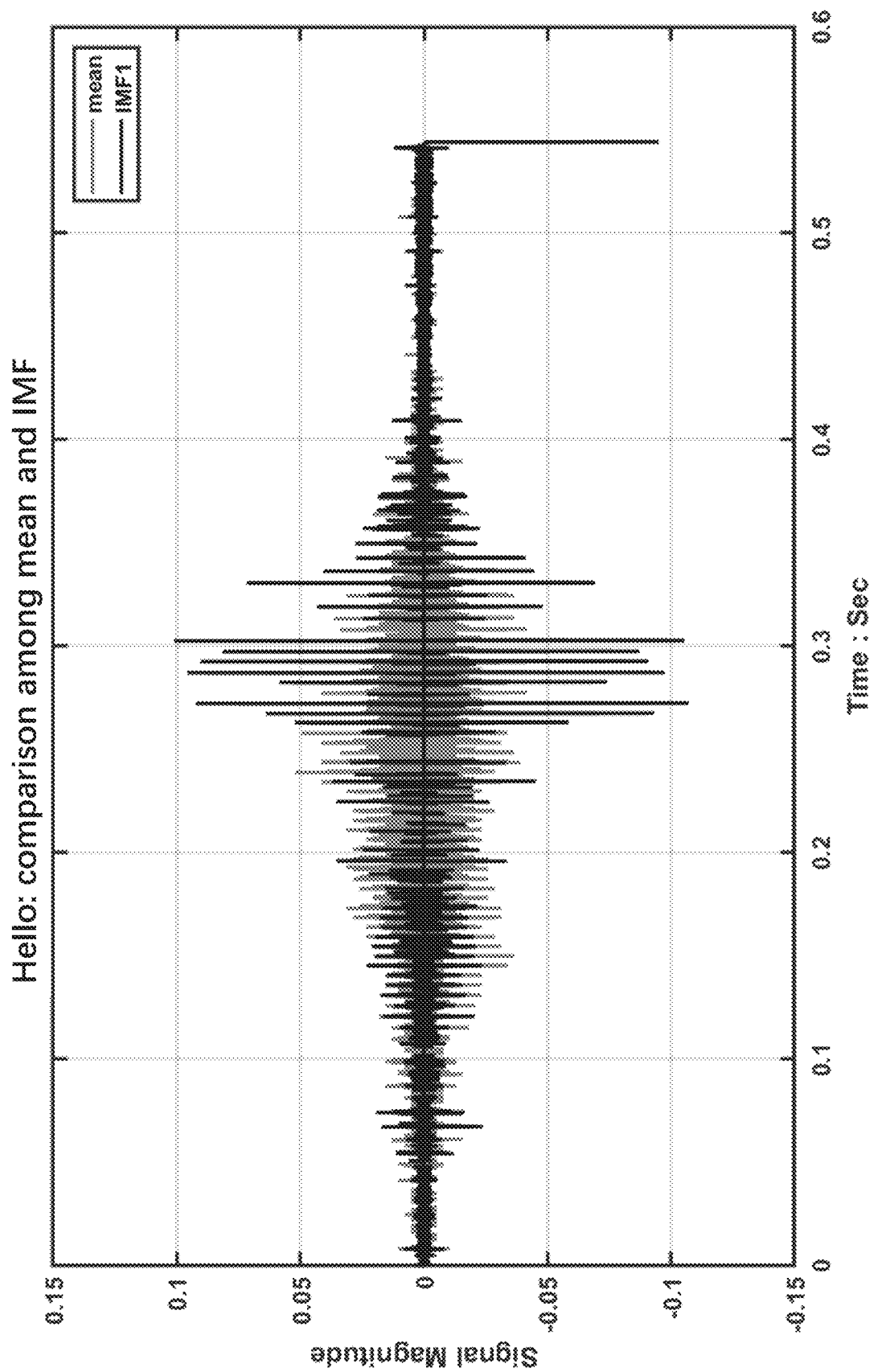
FIG. 18a is the comparison between the first IMF and the mean filtered components.
Figure 18B:
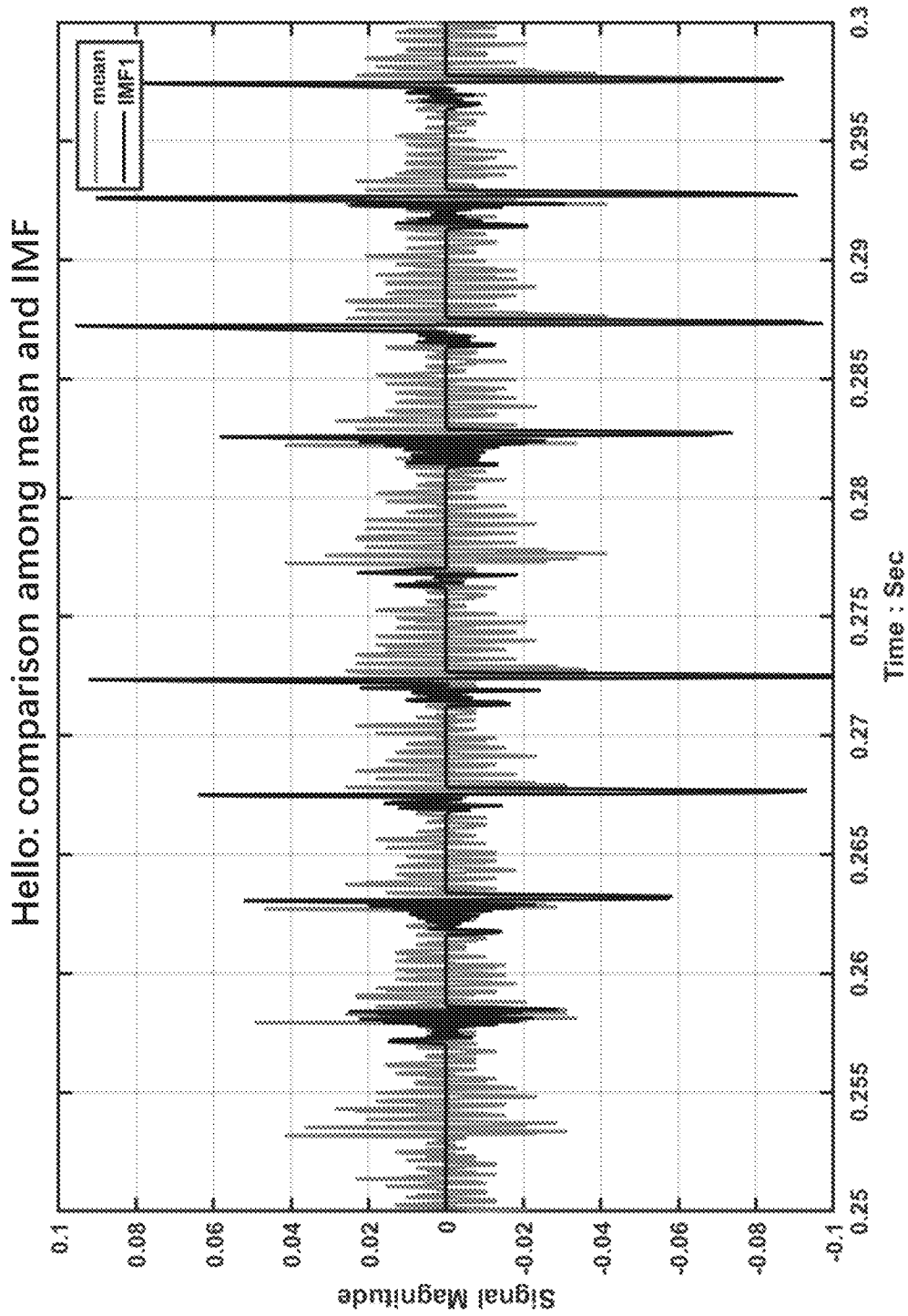
FIG. 18b is a detailed comparison of the differences in the main parts of the signal.

FIG. 18*a* is the comparison between the first IMF and the filtered components. The filter used here is a running mean filter. Overall, they looked similar. Zoomed details are shown in FIG. 18*b*, for a detailed comparison of the differences in the main parts of the signal, where the lack of dynamic range in the running mean filter results is obvious. The filter approach does not guarantee IMF properties; therefore, the instantaneous frequency and the envelop produced would be different from the EMD approach. The most critical shortcoming of the filter approach is that the running mean filter would remove some harmonics of sharp features of lower frequency components. As a result, there would be leakage. However, the filter approach is also complete. The sum of the pseudo-IMFs so produced would add up to recover the original data in full. Based on these considerations, the filter approach could provide an acceptable, but cheaper, substitute of EMD produced IMFs. The filter approach could still have exactly the same effect to increase clarity without increasing loudness, for the diminishing of clarity is due to inadequate representation of the TFS (Temporal Fine Structure, also known as Consonants). This is what we accomplish in this implementation. They still look similar, but the filter approach would loss some sharpness and other qualitative details.

As EMD is more time consuming, even though the computational complexity is comparable to that of Fourier transform. If we use the filter approach, we could get comparable high frequency components as from EMD. The sound might not be as crystal clear, because the mean filter does spread the filtered results over a wider temporal domain (FIGS. 18*a* and 18*b* show the comparisons among different filters in great details). The end results would be less accurate than the full EMD approach. However, the filter approach could be simpler and cheaper to implement.

Additional Implementations

In addition to the hearing aid applications, the sound enhancement based adaptive algorithm of signal decomposition in the present invention can also be used for a communication device, such as a telephone (including a cellphone), a conference call broadcast or any sound transmitting and reproducing device.

Telephone sound is a classical problem for hearing-impaired patients. With the development of the high-quality cellphones, the sound quality has been improved drastically. However, for the hearing-impaired patients, it still could be a challenge. To enhance, denoise and optimization of the sound is highly desirable.

For a conference call broadcast, the fast attenuation of high-frequency components would make the sound reaching the listeners lose its clarity. Therefore, selective amplification of the high frequency would improve the sound quality.

Figure 19:
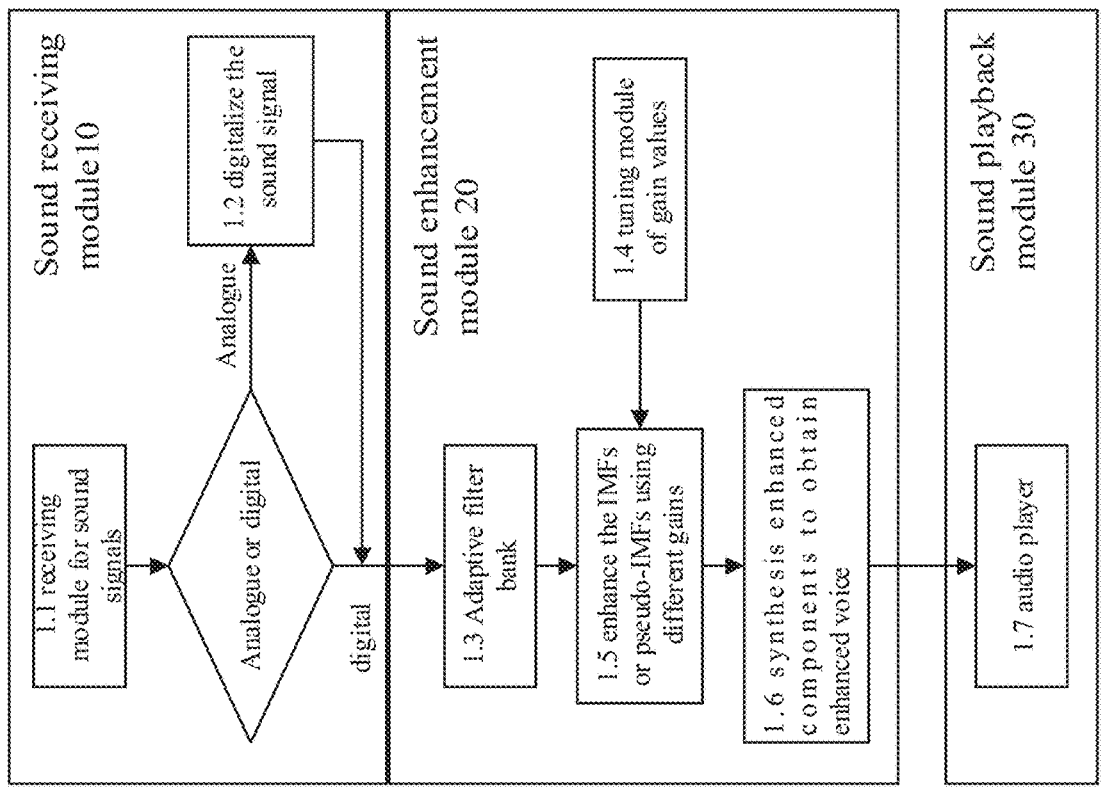
FIG. 19 is a block diagram of an application scenario of a sound enhancement based adaptive algorithm, which is based on the decomposition and selective amplification of signals of communication devices (such as telephones and conference calls).

The algorithm in the present invention can be applied to a telephone or a conference call broadcast. The implementation steps are shown in FIG. 19, in which the key part is the sound enhancement module. FIG. 19 is a block diagram of a sound enhancement apparatus. The sound enhancement apparatus includes a sound receiving module 10, a sound enhancement module 20 and a sound playback module 30. The sound receiving module 10 is configured to receive a sound signal and determine whether the received sound signal is an analog signal or a digital signal. When the received sound signal is an analog signal, the analog signal is converted into a digital signal. The sound enhancement module 20 is configured to selectively amplify the received digital signals. The principle and the detailed steps involved in the key parts of the sound enhancement module are the same as those listed in the hearing aid embodiment. After receiving the digital sound signal, the sound enhancement module 10 processes the sound signal by an adaptive filter bank to obtain a plurality of IMFs or pseudo-IMFs. The adaptive filter bank includes mode decomposition filter bank and mean filter bank. The mode decomposition filter bank refers to any model decomposition method that can obtain the Intrinsic Mode Function components (IMFs) of the signal. The model decomposition method includes Empirical Mode Decomposition (EMD), Ensemble Empirical Mode Decomposition (EEMD), Conjugate Adaptive Dyadic Masking Empirical Mode Decomposition (CADM-EMD). Still further, the EMD could be substituted by, or using anything equivalent to, such as successive running mean filter to obtain the pseudo-IMFs. The obtained IMFs or pseudo-IMFs represent amplitude changes of sound data at different frequency scales over time. The tuning unit of gain values can determine the amplification factors of the sound signal amplitude in different frequency bands according to the measurement results of the hearing impaired. The factors can also be preset according to the frequency range of the consonant. According to the tuning unit of gain values, the obtained IMFs or pseudo-IMFs are selectively amplified. The selectively enhanced IMFs and pseudo-IMFs are reconstituted to obtain an enhanced sound signal. The sound playback module 30 is used for playing the enhanced sound.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sound enhancement method comprising:
   (1) obtaining sound signals and converting the sound signals into digital signals;
   (2) decomposing the digital signals by a mode decomposition method to obtain a plurality of Intrinsic Mode Function components (IMFs), wherein the IMFs represent amplitude changes of the digital signals converted from the sound signals at different frequencies over time;

(3) selectively amplifying the amplitudes of the IMFs obtained in step (2);
(4) reconstituting the selectively amplified IMFs to obtain reconstituted signals;
(5) converting the reconstituted signals into analog signals.

2. The sound enhancement method of claim 1, wherein the mode decomposition method includes Empirical Mode Decomposition (EMD), Ensemble Empirical Mode Decomposition (EEMD), Conjugate Adaptive Dyadic Masking Empirical Mode Decomposition (CADM-EMD).

3. The sound enhancement method of claim 1, wherein when the amplitudes of the IMFs are amplified in step (3), the amplification frequency band and the amplification factors are determined according to the hearing-impaired patient's audiogram.

4. The sound enhancement method of claim 1, wherein when the amplitudes of the IMFs are amplified in step (3), the IMFs in the frequency band of the consonants are amplified.

5. A sound enhancement method comprising:
(1) obtaining sound signals and converting the sound signals into digital signals;
(2) decomposing the digital signals by an adaptive filter bank to obtain a plurality of pseudo-Intrinsic Mode Function components (pseudo-IMFs), wherein the pseudo-IMFs represent the amplitude changes of the digital signals converted from the sound signals at different frequencies over time;
(3) selectively amplifying the amplitudes of the pseudo-IMFs obtained in step (2);
(4) reconstituting the selectively amplified pseudo-IMFs to obtain reconstituted signals;
(5) converting the reconstituted signals into analog signals.

6. The sound enhancement method of claim 5, wherein the adaptive filter bank is a mean filter bank.

7. The sound enhancement method of claim 5, wherein when the amplitudes of the pseudo-IMFs are amplified in step (3), the amplification frequency band and the amplification factors are determined according to the hearing-impaired patient's audiogram.

8. The sound enhancement method of claim 5, wherein when the amplitudes of the pseudo-IMFs are amplified in step (3), the pseudo-IMFs in the frequency band of the consonants are amplified.

9. The sound enhancement method of claim 1, wherein the sound enhancement method can be applied to a hearing aid, a telephone and a conference call broadcast.

10. The sound enhancement method of claim 5, wherein the sound enhancement method can be applied to a hearing aid, a telephone and a conference call broadcast.

11. A sound enhancement apparatus comprising: a sound receiving module, a sound enhancement module and a sound playback module; wherein
the sound receiving module is used to receive sound signals and convert the sound signals into digital signals;
the sound enhancement module is used to process the digital signals to obtain a plurality of Intrinsic Mode Function components (IMFs) or pseudo-IMFs, selectively amplify the amplitudes of the obtained IMFs or pseudo-IMFs, reconstitute the selectively amplified IMFs or pseudo-IMFs to obtain reconstituted signals, and convert the reconstituted signals into analog signals to obtain enhanced sound signals;
the sound playback module is used to play the enhanced sound signals.

12. The sound enhancement apparatus of claim 11, wherein the sound enhancement module includes an adaptive filter bank, an enhancement unit and a reconstituting unit; wherein
the adaptive filter bank is used to decompose the digital signals to obtain the IMFs or pseudo-IMFs;
the enhancement unit is used to selectively amplify the amplitudes of the IMFs or the pseudo-IMFs;
the reconstituting unit is used to reconstitute the amplified IMFs or pseudo-IMFs to obtain the enhanced sound signals.

13. The sound enhancement apparatus of claim 12, wherein the sound enhancement module further includes a tuning unit of gain values, which is used to determine the amplification factors of the sound signal amplitudes needed by a hearing-impaired patient in different frequency bands according to the patient's audiogram, or determine the amplification factors according to the frequency band of the consonants; and then the enhancement unit amplifies the amplitudes of the IMFs or pseudo-IMFs according to the tuning unit of gain values.

14. The sound enhancement apparatus of claim 12, wherein the adaptive filter bank includes a mode decomposition filter bank and a mean filter bank.

15. The sound enhancement apparatus of claim 11, wherein the sound enhancement apparatus can be applied to a hearing aid, a telephone and a conference call broadcast.

* * * * *